(12) United States Patent
Mason et al.

(10) Patent No.: US 12,511,268 B2
(45) Date of Patent: Dec. 30, 2025

(54) DYNAMIC MANAGEMENT AND POPULATION OF DATABASES USING PROGRAMMATIC ROBOTIC PROCESSES

(71) Applicant: The Toronto-Dominion Bank, Toronto (CA)

(72) Inventors: Anthony Joseph Mason, Belfast (GB); Elizabeth Claire Huseynov, Arlington, VA (US); Roman George Schweizer, III, Alexandria, VA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/423,102

(22) Filed: Jan. 25, 2024

(65) Prior Publication Data

US 2025/0225106 A1    Jul. 10, 2025

Related U.S. Application Data

(60) Provisional application No. 63/619,686, filed on Jan. 10, 2024.

(51) Int. Cl.
| | | |
|---|---|---|
| *G06F 16/00* | (2019.01) | |
| *G06F 9/455* | (2018.01) | |
| *G06F 16/21* | (2019.01) | |
| *G06F 16/25* | (2019.01) | |

(52) U.S. Cl.
CPC .......... *G06F 16/21* (2019.01); *G06F 9/45558* (2013.01); *G06F 16/258* (2019.01); *G06F 2009/45562* (2013.01)

(58) Field of Classification Search
None
See application file for complete search history.

(56) References Cited

U.S. PATENT DOCUMENTS

| | | | |
|---|---|---|---|
| 10,114,834 B2* | 10/2018 | Yin | G06F 9/45558 |
| 11,522,812 B1* | 12/2022 | Thoppai | G06F 16/901 |
| 11,799,798 B1* | 10/2023 | Thoppai | H04L 47/828 |
| 2014/0075004 A1* | 3/2014 | Van Dusen | G06F 16/90335 709/223 |
| 2017/0235848 A1* | 8/2017 | Van Dusen | G06Q 30/0201 705/12 |
| 2021/0182248 A1* | 6/2021 | Jayanthi | G06F 9/45558 |
| 2022/0067061 A1* | 3/2022 | Mankad | G06F 9/45558 |

* cited by examiner

*Primary Examiner* — Farhan M Syed
(74) *Attorney, Agent, or Firm* — Nixon Peabody LLP

(57) ABSTRACT

The disclosed embodiments include computer-implemented apparatuses and processes that dynamically manage and populate databases using programmatic robotic processes. For example, an apparatus may obtain queued request data including a key code and a program code associated with a resource. Based on that key code, the apparatus may obtain files of a first format. The apparatus may also extract elements of resource data that include the program code from one of the files, and convert the extracted elements of resource data into elements of tabular data structured in a second format. The apparatus may, based on the elements of tabular data, generate elements of a populated database associated, and transmit message data that includes the elements of the database to a device, which may execute an application program that presents a subset of the elements of the database within a digital interface.

19 Claims, 12 Drawing Sheets

UNCLASSIFIED

| Exhibit P-40, Budget Line Item Justification: PB 2024 Navy | | | | | | | | | Date: March 2023 | |
|---|---|---|---|---|---|---|---|---|---|---|
| Appropriation / Budget Activity / Budget Sub Activity: 1109N: Procurement, Marine Corps / BA 03: Guided missiles and equipment / BSA 1: Guided Missiles | | | | | | | | | P-1 Line Item Number / Title: 2101 / Tomahawk | |
| ID Code (A=Service Ready, B=Not Service Ready): A | | | | Program Elements for Code B Items: N/A | | | | Other Related Program Elements: N/A | | |
| Line Item MDAP/MAIS Code: N/A | | | | | | | | | | |

148

| Resource Summary | Prior Years | FY 2022 | FY 2023 | FY 2024 Base | FY 2024 OCO | FY 2024 Total | FY 2025 | FY 2026 | FY 2027 | FY 2028 | To Complete | Total |
|---|---|---|---|---|---|---|---|---|---|---|---|---|
| Procurement Quantity (units in each) | | | 12 | 24 | | 24 | 24 | 29 | - | - | - | 89 |
| Gross/Weapon System Cost ($ in millions) | 0.000 | 0.000 | 42.866 | 105.192 | 0.000 | 105.192 | 115.046 | 142.060 | 6.319 | 2.446 | - | 414.123 |
| Less PY Advance Procurement ($ in millions) | | | | | | | | | | | | |
| Net Procurement (P-1) ($ in millions) | 0.000 | 0.000 | 42.866 | 105.192 | 0.000 | 105.192 | 115.046 | 142.060 | 6.319 | 2.446 | - | 414.123 |
| Plus CY Advance Procurement ($ in millions) | | | | | | | | | | | | |
| Total Obligation Authority ($ in millions) | 0.000 | 0.000 | 42.866 | 105.192 | 0.000 | 105.192 | 115.046 | 142.060 | 6.319 | 2.446 | - | 414.123 |
| (The following Resource Summary rows are for informational purposes only. The corresponding budget requests are documented elsewhere.) | | | | | | | | | | | | |
| Initial Spares ($ in millions) | | | | | | | | | | | | |
| Flyaway Unit Cost ($ in millions) | | | 2.865% | 2.865% | | 2.865% | 4.880% | 4.832% | - | - | - | 3.08% |
| Gross/Weapon System Unit Cost ($ in millions) | | | | | | | | | | | | |

Description:
The Block V Tactical Tomahawk (TACTOM RGM/UGM-109E) preserves Tomahawk's long-range precision-strike capability while significantly increasing responsiveness and reliability. TACTOM is capable of in-flight retargeting, the ability to loiter over the battlefield, in-flight missile health and status monitoring, and battle damage indication. Other Tomahawk Weapon System functionality includes rapid mission planning and execution via Global Positioning System (GPS) onboard the launch platform and improved anti-jam GPS.

This line item procures Tomahawk missiles for use with the Marine Corps Long Range Fires (LRF) program. The Marine Corps procures the same Tomahawk configuration used by Navy Surface Combatants via the Navy Tomahawk Program Office on common contracts.

Characteristics and dimensions (approximate):
Weight (with booster and canister) (RGM-109): 4,000 pounds
Length (with booster): 20.5 Feet

DYNAMIC MANAGEMENT AND POPULATION OF DATABASES USING PROGRAMMATIC ROBOTIC PROCESSES

CROSS-REFERENCE TO RELATED APPLICATION

This application claims the benefit of priority to U.S. Provisional Patent Application No. 63/619,686, filed on Jan. 10, 2024, the entire disclosure of which is expressly incorporated herein by reference to its entirety.

TECHNICAL FIELD

The disclosed embodiments generally relate to computer-implemented systems and processes that dynamically manage and populate databases using programmatic robotic processes.

BACKGROUND

Large organizations, such as governmental agencies, non-governmental organizations (NGOs), and multinational corporations, expend significant time and effort each fiscal year to estimate and predict forward expected expenditures on staffing, equipment procurement, real estate, research and development, and other resources during a coming fiscal year, e.g., during a budget cycle for that coming fiscal year. In many instances, these efforts result in production of hundreds, if not thousands, of pages of written documentation that include line items characterizing the expected expenditures during the coming fiscal year.

SUMMARY

In some examples, an apparatus includes a memory storing instructions, a communications interface, and at least one processor coupled to the memory and the communications interface. The at least one processor is configured to execute the instructions to obtain queued request data. The queued request data includes a key code and a program code associated with a corresponding resource. The at least one processor is further configured to execute the instructions to, based on the key code, obtain resource files structured in a first format, and perform operations that extract elements of resource data that include at least the program code from a corresponding one of the resource files, and that convert the extracted elements of resource data into elements of tabular data structured in a second format. The at least one processor is further configured to execute the instructions to generate elements of a populated database associated with the corresponding resource based on the elements, and transmit, via the communications interface, message data that includes at least the elements of the populated database to a device. The elements of the populated database are structured in the second format, and the message data causes the device to execute a second application program, and the second application program presents at least a subset of the elements of the populated database within a digital interface.

In other examples, a computer-implemented method includes obtaining queued request data using at least one processor. The queued request data includes a key code and a program code associated with a corresponding resource. The computer-implemented method also includes, based on the key code, obtaining resource files structured in a first format using the at least one processor, and performing operations, using the at least one processor, that extract elements of resource data that include at least the program code from a corresponding one of the resource files, and that convert the extracted elements of resource data into elements of tabular data structured in a second format. Further, the computer-implemented method includes generating, using the at least one processor, elements of a populated database associated with the corresponding resource based on the elements of tabular data, and transmitting message data that includes at least the elements of the populated database to a device using the at least one processor. The elements of the populated database are structured in the second format, and the message data causes the device to execute a second application program that presents at least a subset of the elements of the populated database within a digital interface.

Further, in some examples, a tangible, non-transitory computer-readable medium stores instructions that, when executed by at least one processor, cause the at least one processor to perform a method that includes obtaining queued request data. The he queued request data includes a key code and a program code associated with a corresponding resource. The method also includes, based on the key code, obtaining resource files structured in a first format, and performing operations that extract elements of resource data that include at least the program code from a corresponding one of the resource files, and that convert the extracted elements of resource data into elements of tabular data structured in a second format. Further, the method includes generating elements of a populated database associated with the corresponding resource based on the elements of tabular data, and transmitting message data that includes at least the elements of the populated database to a device. The elements of the populated database are structured in the second format, and the message data causes the device to execute a second application program that presents at least a subset of the elements of the populated database within a digital interface.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 1B is a diagram illustrating a portion of an exemplary resource summary table, in accordance with some exemplary embodiments.

FIG. 3B is a diagram illustrating a portion of an exemplary tabular data file, in accordance with some exemplary embodiments.

Like reference numbers and designations in the various drawings indicate like elements.

DETAILED DESCRIPTION

Figure 1A:
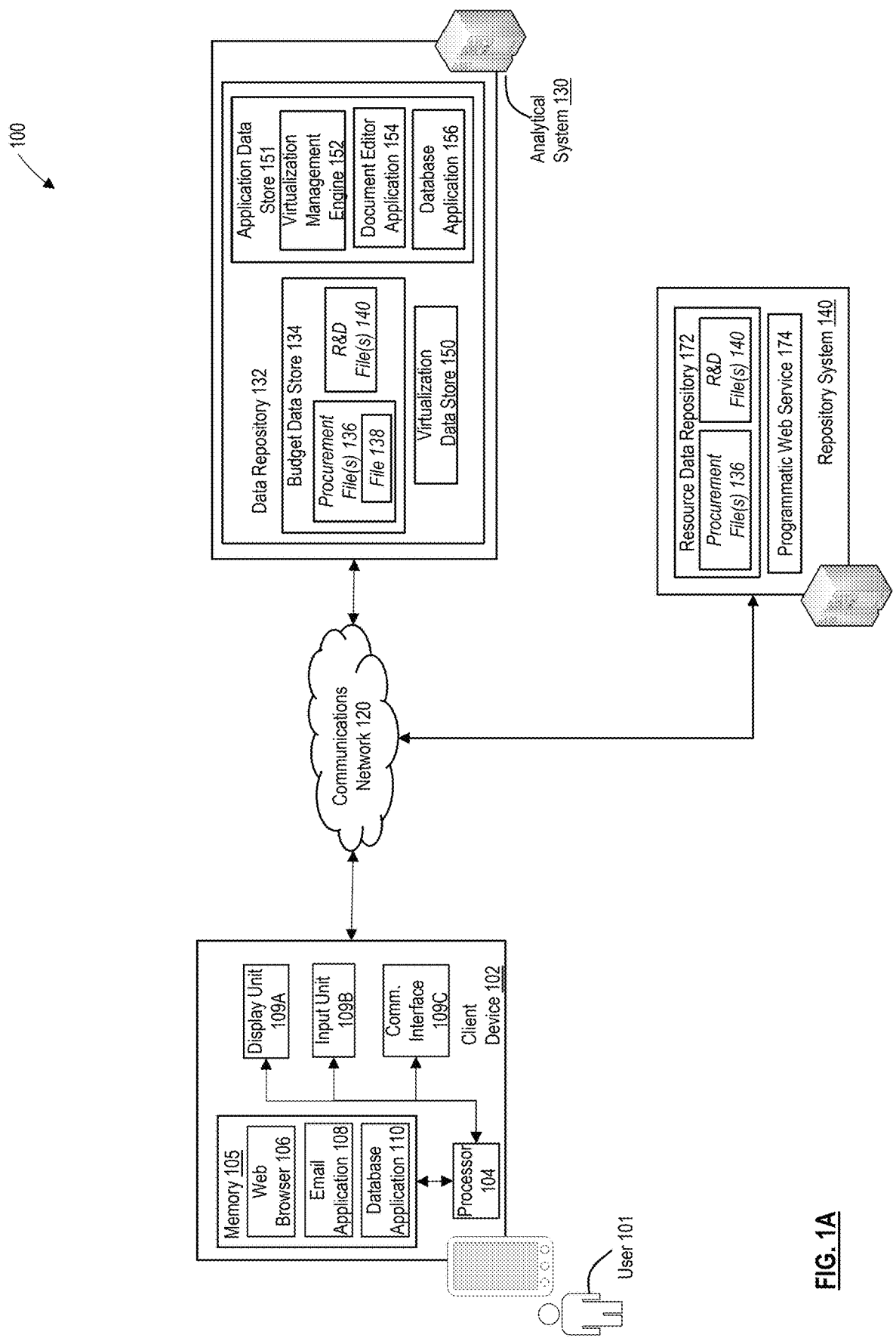
FIG. 1A is a block diagram illustrating portions of an exemplary computing environment, in accordance with some exemplary embodiments.

Today, many large organizations, such as governmental agencies, non-governmental organizations (NGOs), and multinational corporations, expend significant time and effort each fiscal year to estimate and predict forward expected expenditures on staffing, equipment procurement, real estate, research and development, and other resources during a coming fiscal year, e.g., during a budget cycle for that coming fiscal year. In some instances, these efforts result in production of hundreds, if not thousands, of pages of written documentation that include line items characterizing the expected expenditures during the coming fiscal year, and for line-item expenditures involving procurement, real estate, research and development, or other tangible assets, the produced written documentation may corresponding exhibits and justify or supported the proposed line-item expenditures involving these, and other, tangible assets during the coming fiscal year, The written documentation and supporting expenditures may, for example, satisfy one or more auditing processes imposed on these large organizations by internal auditors or by regulatory authorities, or when generated by government agencies, the written documentation and supporting documentation may facilitate an approval of the budgeted expenditures by a corresponding legislative or executive body.

By way of example, the written documentation supporting the budgeting activities of an agency of the U.S. Federal government, such as the Department of Defense (DOD), may be broken into fifty to 100 separate volumes, or "budget books," and each of the separate budget books for the coming fiscal year may exceed several hundred pages in length. The budget books for a particular budget cycle, such as the budget books in support of the expected expenditures during the 2024 fiscal year (e.g., as prepared in 2023), may include discrete groups of budget books characterizing, among other things, projected expenditures related to procurement activities and related to research and development (e.g., "R&D"). In addition to line-items identifying these expenditures during the coming fiscal year, the budget books associated with procurement and R&D may also include exhibits that further characterize these expected expenditures, and that support or justify the appropriations funding these expected expenditures. For instance, the exhibits supporting the line-item expenditures related to procurement and to R&D activities (e.g., as maintained within corresponding ones of the procurement or R&D budget books) may each include a resource summary table, which includes keywords that identify the procurement or R&D activity and the corresponding, requested appropriation, and with values of one or more parameters that characterize the requested appropriation during the coming fiscal year, that characterize the actual appropriations that supported the procurement or R&D activity during one or more prior fiscal years, and further, that characterize an expected impact of the requested appropriation during one or more future fiscal years, e.g., "outyears."

In some instances, the data characterizing the requested appropriations that support the procurement or R&D activities of the DoD, as maintained within the resource summary tables of corresponding ones of the procurement and R&D budget books, may provide valuable insight characterizing time-evolving trends in these procurement or R&D activities, both on an activity-specific level and when aggregated among related activities. These related procurement or R&D activities may be associated with a common class of resources, such as a weapon system, or may involve a common vendor, supplier of research institution, and the data characterizing these trends, when compared against external data characterizing a financial performance of these suppliers, vendors, or research institutions, may provide insights characterizing not only a past performance of these entities, but also on a potential future performance of these entities, which rely on the projected procurement or R&D appropriations.

While these procurement- and R&D-specific budget books may be maintained publicly accessible data repositories in a format accessible across multiple computing platforms, (e.g., as searchable documents structured in portable document format (PDF)), many existing computer-implemented database applications that populate and maintain databases require tabular, input source data having specified formats (e.g., in Microsoft Excel™ format, in XML™ format, or in delimited text format, etc.) and additionally, or alternatively, predetermined data structures or schemas. As such, many of these existing, computer-implemented, database applications are incapable of ingesting the procurement- and R&D-specific budget books directly in their native formats.

To facilitate an ingestion of these procurement- and R&D-specific budget books (and other similarly structured elements of documentation) into these existing computer-implemented database applications, and to leverage and exploit fully the data characterizing the requested appropriations supporting the procurement or R&D activities maintained within the resource summary tables of these budget books, analysts or other operators of these existing systems often generate manually elements of ingestible input data (e.g., in the specified format and/or the predetermined data structures or schemas) that include the parameter values maintained within the summary tables, such as by manual transaction or by manual editing and modification to converted versions of the PDF-based budget books. In some instances, these processes often introduce error into the input source data ingested by these existing systems, as they rely on manual efforts or computer-generated conversions (e.g., optical character recognition processes, etc.) that introduce errors into the input source data.

Upon ingestion by these existing systems and technologies, the errors introduced into the input source files may propagate throughout the populated elements of the corresponding database(s), and reduce the accuracy and reliability of any inferences drawn from an analysis of the populated elements of the database that include the introduced errors. Further, in some instances, the introduction of the erroneous data via the source input files associated with the procurement- and R&D-specific budget books, which result from their ingestion by these existing computer-implemented database population or management systems, may require that these existing systems implement computationally intensive, and potentially disruptive, processes that identify and mediate the introduced errors, which may reduce an available of the corresponding database for use in analytical processing.

In other examples, a virtual machine instantiated or cloned at one or more computing systems, and provisioned with object information and elements of processing logic, may execute a programmatic robot that, through an application of one or more of the exemplary programmatic robotic processes described herein to all or a selected subset of these structured budget books characterizing expected procurement and R&D activities during a coming fiscal year (e.g., in accordance with the elements of processing logic), perform operations that process each of the structured data files characterizing the structured budget books. The robotic processes programmatically convert data maintained within corresponding ones of the resource summary tables into corresponding tabular data ingestible by an executed database application, and the robotic processes programmatically populate portions of a database file with corresponding portions of the tabular data. The populated database file may, in some instances, be accessible to one or more application programs executed at an analyst system or device, and may be searchable and workable by the analyst through an interaction with the one or more one or more application programs. Certain of these exemplary processes, which enable a database application to programmatic ingest, and subsequently process, structured data files in a native format incompatible with the database application, may be implemented in addition to, or as an alternate to, many existing database applications or database population technologies, which are often incapable of ingesting directly these structured data files in their native format without significant, and error-prone, pre-ingestion modifications or conversions.

A. Dynamic Management and Population of Databases Using Robotic Process Automation (RPA) Techniques FIG. 1A is a diagram of an exemplary computing environment 100, consistent with certain disclosed embodiments. For example, as illustrated in FIG. 1A, environment 100 may include one or more computing devices, such as client device 102, and one or more computing systems, such as, but not limited to, an analytical system 130 and a repository system 170. Each of client device 102, analytical system 130, repository system 170, and the additional or alternate computing systems or devices operating within environment 100 may be interconnected through one or more communications networks, such as communications network 120, and examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, one or more of the computing systems and devices operating within environment 100, such as, but not limited to, client device 102, analytical system 130, and repository system 170, may perform operations that establish and maintain one or more secure channels of communication across network 120, such as, but not limited to, a transport layer security (TSL) channel, a secure socket layer (SSL) channel, or any other suitable secure communication channel.

As described herein, analytical system 130 may be associated with, or operated by, a financial institution, a consulting entity, or research or non-governmental organization, and client device 102 may be associated with, or may be operable by, a representative of the financial institution, the consulting entity, or the research or non-governmental entity, such as, but not limited to, user 101. Further, repository system 170 may be associated with a third-party organization unrelated to the financial institution, consulting entity, or research or non-governmental organization associated with analytical system 130, such as, but not limited to, a governmental agency, a private or public corporation, or other reporting entity. In some instances, repository system 170 may maintain, within one or more within one or more publicly accessible data repositories, structured data files that identify and characterize a projected organizational budget for the third-party organization during a current budgeting cycle (e.g., a 2024 fiscal year), and additional structured data files that identifying and characterize the projected organizational budget during one or more previous budgeting cycles (e.g., a 2023 fiscal year, a 2022 fiscal year, etc.).

By way of example, the third-party organization may include an administrative agency of the U.S. Federal government, such as the Department of Defense (DOD), and the structured, and publicly accessible, data files may maintain budget line-items that identify, characterize, and support the projected procurement and research and development (e.g., "R&D") activities and expenditures of one or more branches of the United States military during the current budgeting cycle (e.g., the 2024 fiscal year) and further, actual expenditures on procurement and R&D, and expected expenditures on procurement and R&D during a temporal interval that includes the current fiscal year 2024, for a plurality of programs. In some instances, through an application of one or more of the exemplary, programmatic robotic processes described herein to all or a selected subset of these structured data files, analytical system 130 may perform operations that convert these budget line-items into a database structure accessible to one or more application programs executed at client device 102, and searchable and workable by user 101 through interaction with the one or more application programs.

Referring back to FIG. 1A, client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store software applications, application modules, and other elements of code executable by the one or more processors, such as, but not limited to, an executable web browser 106 (e.g., Google Chrome™, Apple Safari™, etc.), an executable email application 108 (e.g., Microsoft Outlook™, etc.), and an executable database application 110 configured to generate, modify, or operate on tabular data structured in accordance with a corresponding, data format (e.g., a Microsoft Excel™ format, an XML™ format, a delimited text format, etc.). In some instances, not illustrated in FIG. 1A, memory 105 may also include one or more structured or unstructured data repositories or databases, and client device 102 may maintain one or more elements of device data that uniquely identify client device 102 within computing environment 100, and additionally, or alternatively, one or more elements of application data that uniquely identify corresponding ones of executable web browser 106, executable email application 108, or executable database application 110 within computing environment 100. Examples of the elements of device data may include, but are not limited to, an Internet Protocol (IP) address assigned to client device 102 or a media access control (MAC) layer assigned to client device 102, and examples of the application data may include, but are not limited to, an application cryptogram or digital token associated with, or generated by, web browser 106, email application 108, or database application 110.

Client device 102 may also include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

In some instances, each of analytical system 130 and repository system 170 may represent a discrete, computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operation) in a single clock cycle. Further, each of analytical system 130 and repository system 170 may also include a communications interface, such as one or more wireless transceivers, coupled to the one or more processors for accommodating wired or wireless internet communication with other computing systems and devices operating within computing environment 100.

In additional, or alternate, instances, one or more of analytical system 130 and repository system 170 may correspond to a distributed computing system having a plurality of interconnected, computing components distributed across an appropriate computing network, such as communications network 120 of FIG. 1A. For example, analytical system 130 may correspond to a distributed or cloud-based computing cluster associated with and maintained by the financial institution, the consulting entity, or the research or non-governmental entity described herein, although in other examples, analytical system 130 may correspond to a publicly accessible, distributed or cloud-based computing cluster, such as a computing cluster maintained by Microsoft Azure™, Amazon Web Services™, Google Cloud™, or another third-party provider.

By way of example, analytical system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of analytical system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

To perform any of the exemplary processes described herein, analytical system 130 may maintain, within one or more of tangible, non-transitory memories, a data repository 132 that includes a budget data store 134 and a virtualization data store 150. In some instances, and as described herein, budget data store 134 may maintain one or more of the structured, and publicly accessible, data files that identify and characterize the projected organizational budget for the third-party organization during the current budgeting cycle (e.g., the 2024 fiscal year). For example, and as described herein, the third-party organization may include an administrative agency of the U.S. Federal government, such as the Department of Defense (DOD), and the structured, and publicly accessible, data files maintained within budget data store 134 may identify, characterize, and support the projected procurement and research and development (e.g., "R&D") of one or more branches of the United States military during the current budgeting cycle (e.g., the 2024 fiscal year) for a plurality of programs, and further, may identify, characterize, and support the actual expenditures on procurement and R&D, as well as the expected expenditures on procurement and R&D during a temporal interval that includes the current 2024 fiscal year for the plurality of programs.

By way of example, and as illustrated in FIG. 1A, budget data store 134 may include one or more procurement files 136, such as procurement file 138, that include budget line-items, and supporting exhibits, that characterize the projected procurement budget of corresponding branches of the United States military during the current budget cycle (e.g., the 2024 fiscal year), and additionally, or alternatively, during one or more prior budget cycles. The one or more R&D files 140 may, for example, include budget line-items, and supporting exhibits, that characterize the projected R&D budget of the corresponding branches of the United States military during the current budget cycle, and additionally, or alternatively, during one or more prior budget cycles. In some instances, each of procurement files 136 (including procurement file 138) and R&D files 140 may be structured in accordance with a data format accessible to, and associated with, an application program executed by the one or more processors of analytical system 130, such as, but not limited to, in a portable document format (PDF) accessible Adobe Acrobat™ document editor.

As described herein, each of procurement files 136 (including procurement file 138) and R&D files 140 may be accessible publicly, and may be available for download and review by one or more computing systems or devices operating within environment 100, such as, but not limited to, client device 102 operable by user 101 and analytical system 130. Further, as illustrated in FIG. 1A, repository system 170 may maintain each of procurement files 136 (including procurement file 138) and R&D files 140 within a portion of the one or more tangible, non-transitory memories, such as within resource data repository 172, and analytical system 130 may perform operations that: (i) request, and receive, all or a selected portion of procurement files 136 (including procurement file 138) and R&D files 140 from repository system 170 across network 120 in accordance with a predetermined temporal schedule (e.g., at a corresponding temporal point within a budget cycle, etc.); or that (ii) receive programmatically all or a selected portion of procurement files 136 (including procurement file 138) and R&D files 140 across network 120 from repository system 170, e.g., via a "push" operation initiated by repository system 170 in accordance with the predetermined temporal schedule.

Further, in some instances, the one or more processors of repository system 170 may execute a programmatic web service 174, which may cause repository system 170 to establish a secure channel of communications with one or more application programs executed by processor 104 of client device 102, e.g., executed web browser 106. For example, upon execution by processor 104, executed web browser 106 may establish the secure channel of communications with repository system 170 via executed programmatic web service 174, and based on additional input provisioned to client device 102 via input unit 109B, executed web browser 106 may access a web page or other digital interface associated with executed programmatic web service 174. Executed web browser 106 may also request access to each of, or the selected portion of, procurement files 136 (including procurement file 138) and R&D files 140, which may be downloaded to and maintained within budget data store 134 of analytical system 130.

As described herein, each of procurement files 136 (including procurement file 138) and R&D files 140 may characterize a respective one of the projected procurement budget, or the respective R&D budget, for a corresponding branch of the United States military during the 2024 fiscal year (e.g., the current budget cycle). By way of example, each of procurement files 136 and each of R&D files 140 may include an alphanumeric code (e.g., a "key" code) associating the corresponding file with either a procurement appropriation (e.g., a key code having a value of "P") or a R&D appropriation (e.g., a key code having a value of "R"). In some instances, each of procurement files 136 (including procurement file 138) and R&D files 140 may include a plurality of budget line-items, and each of the budget line-items may identify and characterize a procurement appropriation associated with a corresponding budgetary program or initiative (e.g., a procurement of a material resource associated with a corresponding budgetary program, as specified with one of procurement files 136), or a R&D appropriation associated with a corresponding budgetary program or initiative (e.g., an appropriation of funds or materials resources in support of a R&D program, as specified within one of R&D files 140).

Further, each of each of procurement files 136 (including procurement file 138) and R&D files 140 may also include, for each of the budget line-items, elements of exhibit data, such as a resource summary table, that specifies further information (in tabular form) supporting the corresponding one of the procurement appropriation or R&D appropriation associated with the budget line-item. For example, each of the resource summary tables may include one or more keywords that specify the corresponding procurement or R&D appropriation (e.g., an appropriation identifier, a corresponding budget activity or sub activity, etc.), an alphanumeric program code associated with the resource, and a title of that resource. Further, as described herein, each of the resource summary tables may also characterize, among other things, a projected quantity of a corresponding resource allocated to the current budgetary cycle (e.g., the 2024 fiscal year), a gross and net cost associated with the allocation during the current budgetary cycle, and the total obligation associated with the allocation during the current budgetary cycle. In some instances, each, or a selected subset, of the resource summary tables may also characterize an actual allocation of the corresponding resource during one of more prior fiscal years and additionally, or alternatively, an expected allocation of the corresponding resource during one or more future fiscal years (e.g., in completion of a contractual obligation with a vendor associated with the current budgetary cycle, etc.).

For example, procurement file 138 may represent a portion of a "budget book" characterizing a projected procurement budget of the U.S. Navy during fiscal year 2024, and as illustrated in FIG. 1B, procurement file 138 may maintain exhibit data that includes, among other things, a resource summary table 142 characterizing, and supporting, a requested procurement of Tomahawk missiles in fiscal year 2024 (e.g., a budget line-item associated with the Tomahawk missile program). Resource summary table 142 may include one or more keywords 144, such as an appropriation identifier (e.g., "1109N: Procurement, Marine Corps"), an identifier of a budget activity associated with the appropriation (e.g., "BA 03: Guided Missiles and equipment"), and an identifier of a budget sub activity associated with the appropriation (e.g., "BSA 1: Guided Missiles"). Resource summary table 142 may also include an alphanumeric program code and title (e.g., "2101/Tomahawk") associated with the procurement appropriation, which are shown generally within portion 146 of resource summary table 142. Further, an additional portion 148 of resource summary table 142 may specify, in tabular form, a procurement quantity of the resource (e.g., the Tomahawk missiles), a gross cost (e.g., "Gross/Weapon System Cost") and a net procurement (e.g., "New Procurement (P-1)"), and a total obligation (e.g., "Total Obligation Authority") associated with the requested procurement during the 2024 fiscal year, during one or more future fiscal years (e.g., the 2025, 2026, 2027, and 2028 fiscal years), and in some instances, during one or more prior fiscal years (e.g., the 2022 and 2023 fiscal years).

Although illustrated in FIG. 1B, procurement file 138 may include additional resource summary tables characterizing and supporting each of the budget-line items (e.g., the requested, procurement appropriations) specified within procurement file 138, and the elements of exhibit data maintained within each additional, or alternate, one of procurement files 136, and each of R&D files 140, may include similar resource tables characterizing corresponding ones of a procurement appropriation or a R&D appropriation requested by the budget line-items specified within procurement files 136 and R&D files 140

Referring back to FIG. 1A, virtualization data store 150 may include elements of data that facilitate an execution of one or more software robots (e.g., "programmatic bots") by one or more virtual machines instantiated at analytical system 130, e.g., by executed virtualization management engine 152 using any of the exemplary processes described herein. Each of the executed programmatic bots may, for example, include one or more objects and elements of processing logic that encode sequential operations performed by corresponding ones of the objects. In some instances, one or more of the objects may be configured by the elements of the processing logic to interact with a corresponding one of the application programs executed by the analytical system 130, such as, but not limited to, a document editor application 154 (e.g., an application program, such as Adobe Acrobat™, capable of reading, interacting with, or modify subsets of procurement files 136 and R&D files 140 structured in PDF form) and a database application 156 (e.g., an application program, such as Microsoft Excel™, capable of generating, modifying, or operating on tabular data structured in accordance with a corresponding, database format). Further, each of the one or more objects may include, and may be defined by, corresponding application models and corresponding elements of action data associated, respectively, with a corresponding one of executed document editor application 154 or executed database application 156.

By way of example, a first one of the objects may be configured by the elements of the processing logic to interact with executed document editor application 154, and to perform actions or operations specified by the elements of processing logic, such as, but not limited to: accessing and opening each of a determined set of resource files consistent with a queued database population request and structured in accordance with a first format (e.g., each, or a subset, of procurement files 136, or each, or selected subset, of R&D files 140, in PDF form, etc.); and interacting programmatically with a graphical user interface (GUI) or digital portal of executed document editor application 154 to identify one or more resource summary tables that include at least a program identifier associated with the queued database population request (e.g., based on a keyword search), to extract portions of corresponding ones of the resource files structured in the first format, and to convert the extracted portions of the into one or more converted files structured in a second format (e.g., one or more converted files maintaining tabular data in a Microsoft Excel™ format, etc.). In some instances, the one or more executed programmatic bots may store the converted file, or each of the converted files, within the one or more tangible, non-transitory memories of analytical system 130.

The first one of the objects may include, and may be defined by, corresponding application models and corresponding elements of action data, which may expose the first one of the objects to executed document editor application 154, and may identify and characterize interface elements displayed within one or more display screens of the corresponding GUI or digital portal of executed document editor application 154 (e.g., a type of interface element, an appropriate format or structure of input data, etc.). Further, and for the first one of the objects, the elements of action data may identify those discrete or sequential programmatic actions that the object can perform during interaction with the GUI) or digital portal of executed document editor application 154 and in accordance with the application model, such as, but not limited to, a sequence of discrete, programmatic inputs to the GUI or digital portal (e.g., keystrokes, interaction with or selection of corresponding interface elements within menus, etc.) that initiate and perform the keyword search, extract the portion(s) of the resource files structured in the first format, and that convert the extract portions into converted files structured in a second format.

Further, in some examples, a second one of the objects may be configured by the elements of the processing logic to interact with executed database application 156, and to perform actions or operations specified by the elements of processing logic, such as, but not limited to: accessing and opening each of the converted file(s) and a corresponding resource template files associated with the queued database population request; and interacting programmatically with a graphical user interface (GUI) or digital portal of executed database application 156 to extract, for one or more of the converted file(s), elements of tabulated data that characterize the requested appropriation of the resource associated with the program identifier during the current budgeting cycle (and the actual and expected appropriations of that resource during a temporal interval that includes the current budgeting cycle, etc.), to identify a portion of the resource template file associated with the program identifier, and to populate corresponding, specified elements of the resource template file with the elements of tabulated data. In some instances, and through a performance of one or more of these exemplary processes, the one or more executed programmatic bots may generate a portion of a populated database file that includes the elements of tabulated data and that is structured in the second format, which may be stored within the one or more tangible, non-transitory memories of analytical system 130.

The second one of the objects may also include, and may be defined by, corresponding application models and corresponding elements of action data, which may expose the second one of the objects to executed database application 156, and may identify and characterize interface elements displayed within one or more display screens of the corresponding GUI or digital portal of executed database application 156 (e.g., a type of interface element, an appropriate format or structure of input data, etc.). Further, and for the first one of the objects, the elements of action data may identify those discrete or sequential programmatic actions that the object can perform during interaction with the GUI or digital portal of executed database application 156 in accordance with the application model. The discrete or sequential programmatic actions may include, but are not limited to, a sequence of discrete, programmatic inputs to the GUI or digital portal (e.g., keystrokes, an interaction with or selection of corresponding interface elements within menus, etc.) that select and extract specified elements of the tabular data from each of the converted files (e.g., via an invocation of "cut" or "copy" functionality of the GUI and executed database application 156), that populate the specified elements of the resource template file with the elements of tabular data (e.g., via an invocation of a "paste" functionality of the GUI and executed database application 156), and that store the populated database file in the second format (e.g., via an invocation of a "save" functionality of the GUI and executed database application 156).

Referring back to FIG. 1A, and to facilitate the performance of the exemplary programmatic, robotic operations described herein, virtualization data store 150 may maintain, within structured or unstructured data records, one or more elements of the processing logic, one or more of the application models, and corresponding elements of action data that, when provisioned or rendered accessible to the instantiated virtual machines, facilitates the execution of corresponding ones of the bots and the specified interaction between these bots and executed document editor application 154, executed database application 156, or other application programs executed by analytical system 130, e.g., in accordance with the elements of processing logic. Further, although not illustrated in FIG. 1A, virtualization data store 150 may also maintain, within the structured or unstructured data records, information associated with one or more tools (e.g., bot development tools, bot management tools, etc.), libraries, and runtime environments for programmatic bots executed by the instantiated virtual machines.

Virtualization data store 150 may also maintain, within the structured or unstructured data records, elements of session data that characterize a performance of each of the virtual machines instantiated by analytical system 130 and additionally, or alternatively, the sequential operations performed by each of the programmatic bots executed by the instantiated virtual machines, e.g., through the performance of the exemplary programmatic, robotic operations described herein (not illustrated in FIG. 1A). In some instances, the elements of session data maintained within virtualization data store 150 may enable one or more applications executed by analytical system 130 to monitor, and adaptively adjust, the subset of the queued and prioritized elements of payment and/or vendor data allocated to each of the instantiated virtual machines.

Referring back to FIG. 1A, analytical system 130 may also maintain, within data repository 132, an application data store 151 that maintains one or more executable application programs, such as, but not limited to, virtualization management engine 152, and document editor application 154 and database application 156, as described herein. When executed by the one or more processors of analytical system 130, virtualization management engine 152 may perform operations that instantiate and/or clone one or more virtual machines executable by analytical system 130 and provision, to the instantiated or cloned virtual machines, corresponding ones of the application models and the elements of action data (e.g., as object information), which establish respective ones of the programmatic bots executable by the virtual machines, and the corresponding elements of processing logic, which establish the sequential operations performed by each of the executed programmatic bots.

By way of example, and upon execution by the one or more processors of analytical system 130, virtualization management engine 152 may perform operations consistent with a virtual machine manager (VMM) or hypervisor that, among other things, provides each of the instantiated virtual machines with a virtual operating platform and manages the execution of the programmatic bots by these virtual machines using the virtual operating platform and in accordance with the corresponding elements of the processing logic. Further, executed virtualization management engine 152 may also perform operations that monitor a performance and operation of each of the instantiated virtual machines and additionally, or alternatively, each of the execution of programmatic bots, and that store corresponding elements of session data indicative of the monitored performance and operation within virtualization data store 150.

In some instances, a user of client device 102, such as user 101, may elect to analyze one or more trends in the procurement appropriations, and additionally, or alternatively, the R&D appropriations associated with one or more programs or initiatives an administrative agency of the U.S. Federal government, such as the Department of Defense (DOD) during a current budget cycle (e.g., projected procurement or R&D appropriations) and further, across one or more prior and future temporal intervals. For example, and for a particular program of the DOD, such as the Tomahawk missile program described herein, user 101 may elect to analyze the projected procurement and R&D appropriations associated with the Tomahawk missile program during the current budgeting cycle (e.g., the 2024 fiscal year), and compare those projected procurement and R&D appropriations against not only comparable procurement and R&D appropriations during one or more prior fiscal years, but also against an expected impact of the currently projected procurement and R&D appropriations on one or more future fiscal years, e.g., "outyears." Additionally, in some instances, user 101 may also elect to not only analyze a temporal variation in the procurement and R&D appropriations that support Tomahawk missile program during these fiscal years, but also to compare the temporal variations in these procurement and R&D appropriations (e.g., in support of the Tomahawk missile program) against similar procurement and R&D appropriations that support specific resource and specific programs of interest to user 101, and further, to compare against aggregated procurement and R&D appropriations across classes or groups of resources, and corresponding programs, of interest to user 101.

As described herein, procurement files 136 and R&D files 140 (e.g., as maintained within budget data store 134) may include data that identifies, characterizes, and supports the budgeted procurement and R&D appropriations for one or more branches of the United States military during the current budgeting cycle (e.g., the 2024 fiscal year), and also specifies actual procurement and R&D appropriations during one or more prior fiscal years, and expected procurement and R&D appropriations extending forward (e.g., derived from the budgeted procurement and R&D appropriations during the current budgeting cycle) in one or more future fiscal years, e.g., outyears described herein. In some instances, each of procurement files 136 and R&D files 140 may represent a corresponding one of the budget books that support the budgeted procurement and R&D appropriations for one or more branches of the United States military during the current budgeting cycle, and each of the budget books may be formatted in a corresponding, standardized format, such as a portable document format (PDF), which and may be publicly accessible to client device 102 and analytical system 130 across network 120, e.g., via executed programmatic web service 174.

While the tabular data maintained within these digital budget books may identify and characterize the budgeted procurement and R&D appropriations associated with the current budgeting cycle, along with the actual procurement and R&D appropriations during the one or more prior fiscal years and the expected procurement and R&D appropriations extending forward throughout the outyears, budget data store 134 may often maintain in excess of fifty discrete, digital budget books for the current budgetary cycle (e.g., corresponding ones of procurement files 136 and R&D files 140), and each of the discrete, digital budget books may include in excess of several hundred pages of budget line-items and support exhibits (e.g., corresponding "P" exhibits supporting procurement appropriations and corresponding "R" exhibits supporting R&D appropriations within the budget books). In some instances, to analyze the projected procurement and R&D appropriations associated with the Tomahawk missile program during the current budgeting cycle (e.g., the 2024 fiscal year), user 101 may provide input to client device 102 (e.g., via input unit 109B) that causes processor 104 of client device 102 to execute a document editor application consistent with the structured format digital budget books, and to open a first one of the digital budget books within the executed document editor application.

User 101 may, for example, provide further input to client device 102 that scrolls through, or searches within, the first one of the budget books, and identifies the resource summary tables associated with the projected procurement appropriations associated with the Tomahawk missile program during the current budgeting cycle or projected R&D appropriations associated with the Tomahawk missile program during the current budgeting cycle. In some instances, user 101 may provide input to client device 102 (e.g., via input unit 109B) that causes processor 104 to execute database application 110 (e.g., the Microsoft Excel™), and based on additional input provisioned via input unit 109B, user 101 may enter manually values of one or more parameters that characterize the projected procurement or R&D appropriation associated with the Tomahawk missile program during the current budgeting cycle (including the values characterizing the actual procurement or R&D appropriation during the one or more, and the values characterizing the expected impact of the current, projected procurement or R&D appropriations on one or more outyears) into corresponding portions of a database file structured in a format consistent with executed database application 110. In some instances, these exemplary operations, which may be performed by executed document editor application and executed database application 110 in response to corresponding element of input from user 101, may be repeated to populate the database file with further parameter values characterize the projected procurement or R&D appropriation associated with the Tomahawk missile program during the current budgeting cycle and additionally, or alternatively, the projected procurement or R&D appropriation associated with other resources and corresponding programs of interest to user 101 during the current budgeting cycle.

Additionally, while existing, computer-implemented processes may populate database structures or files with source data. These existing, computer implemented processes often ingest, and rely on a programmatic decomposition of, source data files having a predetermined format consistent (e.g., a text-based file delimited in accordance with a specified data schema, etc.) that is inconsistent with the format or structure of the digital data books within procurement files 136 and R&D files 140 (e.g., structured as PDFs, etc.). Further, as each of the digital data books incorporate the tabular data characterizing the projected procurement or R&D appropriations associated with corresponding ones of the resources within resource summary tables, which may be maintained as exhibits within the digital data books, these existing, computer-implemented processes may be incapable of identifying, and extracting, appropriation-specific elements of tabular data from corresponding ones of the exhibits, or of converting the extracted, appropriation-specific elements of tabular data into a format ingestible by these existing, computer-implemented processes.

In other instances, described herein, client device 102 and analytical system 130 may perform collectively operations that, based on an application of one or more of the exemplary, programmatic robotic processes described herein to all, or a selected subset of, procurement files 136 and R&D files 140, convert corresponding, resource- and program-specific elements of tabular data that identify, characterize, and support the projected procurement and R&D appropriations during the current budgeting cycle (e.g., the 2024 fiscal year) into a database structure accessible to one or more application programs executed at client device 102, such as database application 110, and searchable and workable by user 101 through interaction with executed database application 110, e.g., based on input provisioned to client device 102 via input unit 109B. By way of example, referring to FIG. 2A, the one or more processors of client device 102, such as processor 104, may execute email application 108 in accordance with a predetermined temporal schedule (e.g., at a predetermined date or time within the current budgetary cycle) or based on input provisioned to client device 102 by user 101 (e.g., via input unit 109B).

Figure 2A:
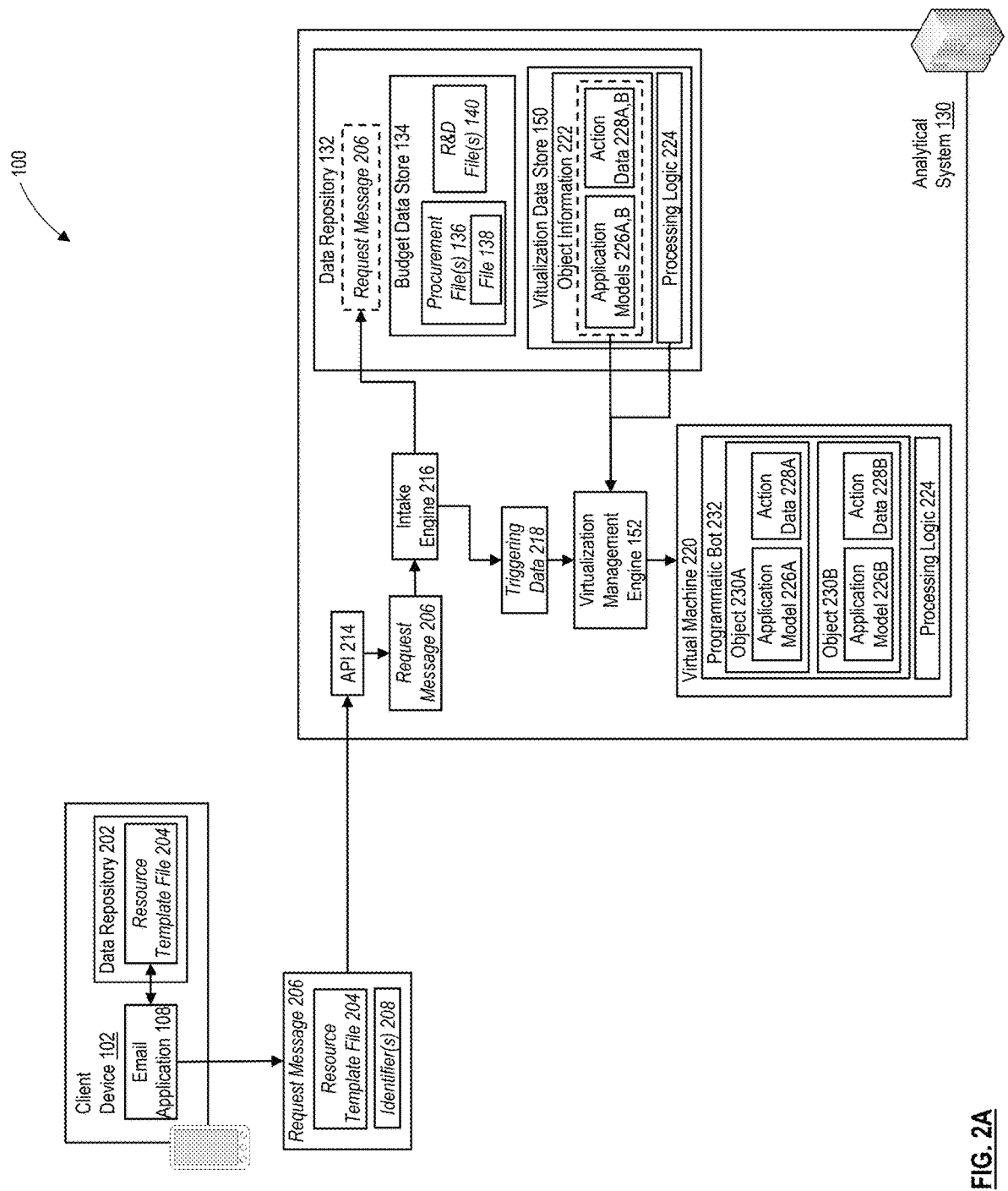
FIG. 2A is a block diagram illustrating portions of an exemplary computing environment, in accordance with some exemplary embodiments.

Executed email application 108 may, for example, access a data repository 202 maintained within the one or more tangible, non-transitory memories of client device 102 (e.g., memory 105, etc.), and may obtain a resource template file 204 associated with all, or a selected portion, of procurement files 136 and R&D files 140 maintained by analytical system 130 within budget data store 134. In some instances, executed email application 108 may package resource template file 204 within a corresponding portion of a request message 206 (e.g., an email message structured in accordance with one or more email-based communications protocols), along with one or more identifiers 208 of user 101, client device 102, and/or executed email application 108. Examples of identifiers 208 may include, but are not limited to, an alphanumeric identifier of user 101 (e.g., one or more login credentials provisioned by analytical system 130), an Internet Protocol (IP) or media access control (MAC) address of client device 102, and an application cryptogram or digital token of executed email application 108, and as illustrated in FIG. 2A, executed email application 108 may cause client device 102 to transmit request message 206, including resource template file 204 and identifiers 208, across network 120 to analytical system 130.

By way of example, resource template file 204 may include discrete elements of tabular data (e.g., rows) associated with all, or a selected subset, of the resource summary tables maintained within procurement files 136 (e.g., within a corresponding, procurement-specific partition of resource template file 204, such as a corresponding, procurement-specific "worksheet" of a Microsoft Excel™ file), and additional, discrete elements of tabular data (e.g., rows) associated with all, or a selected subset, of the resource summary tables maintained within R&D files 140 (e.g., within an additional, R&D-specific partition of resource template file 204, such as a corresponding, R&D-specific "worksheet" of the Microsoft Excel™ file). For instance, resource template file 204 may include, within the procurement-specific partition, one or more rows associated with a particular resource summary table maintained within a corresponding one of procurement files 136, and further, may also include, within the R&D-specific partition, one or more rows associated with a particular resource summary table maintained within a corresponding one of R&D files 140.

In some instances, each row of resource template file 204 (e.g., disposed within corresponding ones of the procurement- and R&D-specific worksheets) may be associated with a corresponding one of the line items maintained within that particular resource summary table (e.g., the procurement quantity, gross cost, total obligation authority, etc.), and may include columns populated with corresponding ones of the keywords that specify the corresponding appropriation (e.g., an appropriation identifier, a corresponding budget activity or sub activity, etc.) and an alphanumeric program code and title associated with the resource. Further, each row may also include one or more additional columns without data (e.g., "empty" columns), which may be populated with corresponding values of the line items maintained within that particular resource summary table for the current budget cycle, for one or more future outyears, and for one or more prior fiscal years, through an implementation of any of the exemplary programmatic robotic processes described herein.

Figure 2B:
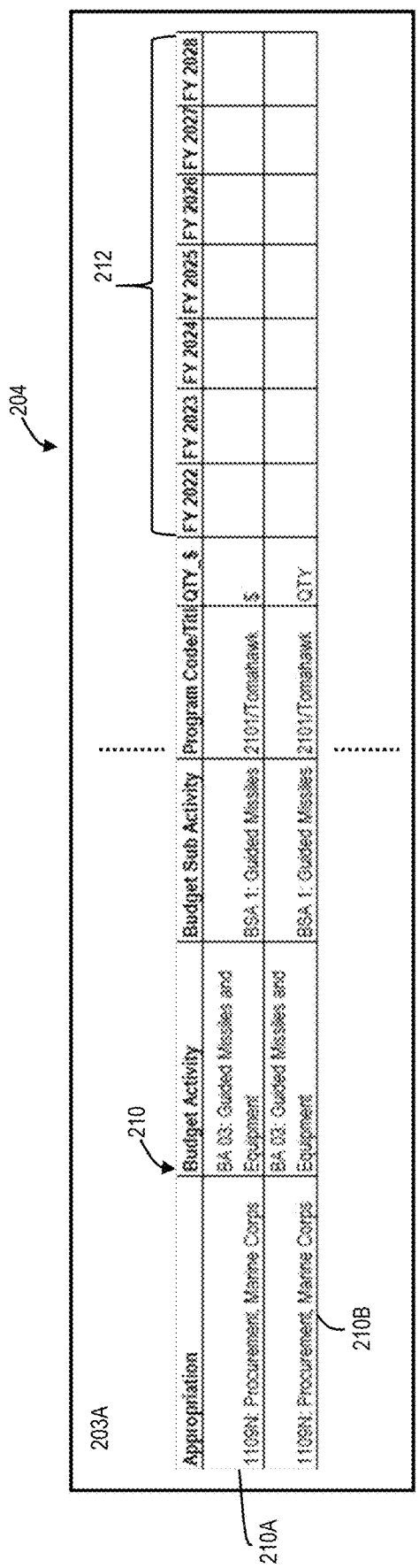
FIG. 2B is a diagram illustrating a portion of an exemplary resource template file, in accordance with some exemplary embodiments.

As described herein, procurement file 138 may include, among other things, a resource summary table 142 that characterizes, and supports, a requested procurement of Tomahawk missiles in fiscal year 2024, and referring to FIG. 2B, a procurement-specific partition 204A of resource template file 204 (e.g., a procurement-specific worksheet, etc.) may include rows 210 associated with corresponding ones of the line items maintained within resource summary table 142. By way of example, rows 210 may include a discrete row 210A associated with the quantities of Tomahawk missiles subject to procurement during the current budget cycle for fiscal year 2024, projected for procurement during outyears 2025, 2026, 2027, and 2028 (e.g., projections derived from the quantities of Tomahawk missiles subject to procurement during the current budget cycle for fiscal year 2024), and Tomahawk missiles actually procured during prior fiscal years 2022 and 2023, as well as a discrete row 210B associated with a total obligation authority, in millions of dollars, of the projected or actual procurement of Tomahawk missiles during each of these fiscal years. As illustrated in FIG. 2B, each of rows 210A and 210B may include columns of data specifying corresponding ones of the keywords of the appropriation, such as, but not limited to, appropriation identifier (e.g., "1109N: Procurement, Marine Corps"), the identifier of the budget activity associated with the appropriation (e.g., "BA 03: Guided Missiles and equipment"), and the identifier of the budget sub activity associated with the appropriation (e.g., "BSA 1: Guided Missiles"), as well as additional columns specifying corresponding ones of alphanumeric program code and title of the appropriation (e.g., "2101/Tomahawk"). Further, as illustrated in FIG. 2B, columns 212 of each of rows 210A and 210B (e.g., associated with fiscal years 2022, 2023, 2024, 2025, 2026, 2027, and 2028) may be empty, and may be populated with corresponding values of the procurement quantity and total obligation authority from resource summary table 142 using any of the exemplary processes described herein.

The disclosed, exemplary embodiments are not limited resource template files, such as resource template file 204, that include rows within corresponding procurement-specific partition 204A that characterize procurement of Tomahawk missiles during the current budget cycle for fiscal year 2024, during outyears 2025, 2026, 2027, and 2028, and during prior fiscal years 2022 and 2023. In some examples, not illustrated in FIG. 2B, procurement-specific partition 204A of resource template file 204 may include further rows associated with corresponding ones of the line items of additional, or alternate, resource summary tables maintained within procurement file 138, or within any additional, or alternate, one of procurement files 136. Further, although not illustrated in FIG. 2B, an R&D-specific partition of resource template file 204 may include one or more rows associated with line items of corresponding resource summary tables maintained within one or more of R&D files 140. The structure and composition of the rows within the R&D-specific partition of resource template file 204, which may be associated with the line-items of corresponding ones of the resource summary tables maintained within R&D files 140, may be similar to rows 210A and 210B (and additional, or alternate, rows) within procurement-specific partition 204A.

Referring back to FIG. 2A, a programmatic interface established and maintained by analytical system 130, such as an application programming interface (API) 214 associated with an intake engine 216 executed by the one or more processors of analytical system 130, may receive request message 206, including resource template file 204 and identifiers 208, and route request message 206 to executed intake engine 216. In some instances, executed intake engine 216 may perform operations that store request message 206 within a corresponding portion of the one or more tangible, non-transitory memories of analytical system 130, e.g., within data repository 132. Further, and responsive to the receipt of request message 206, executed intake engine 216 may also generate one or more elements of triggering data 218 that, when ingested by executed virtualization management engine 152, cause executed virtualization management engine 152 to perform operations that that instantiate (or clone) one or more virtual machines at analytical system 130.

For example, executed virtualization management engine 152 may perform operations that instantiate virtual machine 220, and additionally, or alternatively, may clone virtual machine 220 from one or more previously instantiated virtual machines (not illustrated in FIG. 2A). In other examples, also not illustrated in FIG. 2A, executed virtualization management engine 152 may perform operations that instantiate and/or clone a plurality of virtual machines executing at analytical system 130, including virtual machine 220. As described herein, each of the executed programmatic bots may include, and may be established by, one or more corresponding executable objects, and the elements of processing logic may encode sequential operations performed by corresponding ones of the objects. Further, the executable objects may be configured by the elements of the processing logic to interact with one or more application programs executed by analytical system 130, such as document editor application 154 and database application 156, and to perform actions or operations specified by the elements of processing logic. These specific actions or operations, which may be performed by one or more programmatic bots executed by virtual machine 220, may include, but are not limited to: obtaining program codes and corresponding procurement and R&D key codes from the table-specific rows of resource template file 204 (e.g., program code "2101" and procurement code "P" associated with rows 210A and 210B); queuing database population requests that include corresponding ones of the program codes and the key codes; identifying, for each of the queued database population requests, resource summary tables within corresponding ones of procurement files 136 and/or R&D files 140 that include specified keywords (e.g., the term "Resource Summary" and corresponding program code); extracting the identified resource summary tables (e.g., in a first format, such as a PDF format, etc.) and converting the extracted resource summary tables into files having a second format (e.g., an Excel™ format, an XML™ format, a delimited text format, etc.) and populating the resource-specific rows of resource template file 204 associated with each of the database population requests with corresponding portions of the converted files.

To facilitate such interaction, the executable objects may include, and may be defined by, corresponding application models and corresponding elements of action data. Referring back to FIG. 2A, executed virtualization management engine 152 may perform operations that access virtualization data store 150 maintained within data repository 132, and operations that provision, to instantiated virtual machine 220, object information 222 and one or more elements of processing logic 224. In some instances, object information 222 may include application models 226A and 226B, and elements of action data 228A and 228B. Virtual machine 220 may process object information 222 and perform operations that generate a plurality of executable objects, such as object 230A based on application model 226A and action data elements 228A, and object 230B associated with application model 226B and action data elements 228B. Further, virtual machine 220 may also perform operations that generate one or more programmatic software robots, e.g., "bots," that include each of, or selected subsets of, the executable objects, such as, but not limited to, a programmatic software robot, e.g., bot 232, that includes executable objects 230A and 230B. The disclosed embodiments are, however, not limited to the generation of a single bot that includes executable objects 230A and 230B, and in other examples, virtual machine 220 may perform operations that generate any number of additional or alternate programmatic software robots that include, respectively, one of executable objects 230A and 230B, or an additional, or alternate, executable object generated using any of the exemplary processes described herein.

By way of example, application model 226A may expose object 230A to executed document editor application 154 associated with procurement files 136 and R&D files 140 (e.g., an executed Adobe Acrobat™ program), and may be configured by the elements of processing logic 224 to interact with executed document editor application 154 and to perform actions or operations specified by the elements of processing logic 224. Examples of the actions or operations performed programmatically by object 230A may include, but are not limited to: accessing and opening each of a determined set of resource files consistent with a queued database population request and structured in accordance with a first format (e.g., each, or a subset, of procurement files 136, or each, or selected subset, of R&D files 140, in PDF form, etc.); and interacting programmatically with a graphical user interface (GUI) or digital portal of executed document editor application 154 to identify one or more resource summary tables that include at least a program identifier associated with the queued database population request (e.g., based on a keyword search), to extract portions of corresponding ones of the resource files structured in the first format, and to convert the extracted portions of the into one or more converted files structured in a second format (e.g., one or more converted files maintaining tabular data in a Microsoft Excel™ format, etc.). In some instances, the one or more executed programmatic bots may store the converted file, or each of the converted files, within the one or more tangible, non-transitory memories of analytical system 130.

As described herein, object 230A may include, and may be defined by, application model 226A and corresponding elements of action data 228A, which may expose object 230A to executed document editor application 154, and which may identify and characterize interface elements displayed within one or more display screens of the corresponding GUI or digital portal of executed document editor application 154 (e.g., a type of interface element, an appropriate format or structure of input data, etc.). For example, the elements of action data 228A may identify those discrete or sequential programmatic actions that object 230A may perform during interaction with the GUI or digital portal of executed document editor application 154 and in accordance with application model 226A, such as, but not limited to, a sequence of discrete, programmatic inputs to the GUI or digital portal (e.g., keystrokes, selection of corresponding interface elements within menus, etc.) that initiate and perform the keyword search, extract the portion(s) of the resource files structured in the first format, and that convert the extract portions into converted files structured in a second format.

Further, in some examples, application model 226B may expose object 230B to executed database application 156, and may be may be configured by the elements of processing logic 224 to interact with executed database application 156, and to perform actions or operations specified by the elements of processing logic 224. Examples of the actions or operations performed programmatically by object 230B may include, but are not limited to: accessing and opening each of the converted file(s) and a corresponding resource template files associated with the queued database population request; and interacting programmatically with a graphical user interface (GUI) or digital portal of executed database application 156 to extract, for one or more of the converted file(s), elements of tabulated data that characterize the requested appropriation of the resource associated with the program identifier during the current budgeting cycle (and the actual and expected appropriations of that resource during a temporal interval that includes the current budgeting cycle, etc.), to identify a portion of the resource template file associated with the program identifier, and to populate corresponding, specified elements of the resource template file with the elements of tabulated data. In some instances, and through a performance of one or more of these exemplary processes, the one or more executed programmatic bots may generate a portion of a populated database file that includes the elements of tabulated data and that is structured in the second format, which may be stored within the one or more tangible, non-transitory memories of analytical system 130.

As described herein, object 230B may also include, and may be defined by, application model 226B and corresponding elements of action data 228B, which may expose object 230B to executed database application 156, and may identify and characterize interface elements displayed within one or more display screens of the corresponding GUI or digital portal of executed database application 156 (e.g., a type of interface element, an appropriate format or structure of input data, etc.). By way of example, the elements of action data 228B may identify those discrete or sequential programmatic actions that object 230B can perform during interaction with the GUI or digital portal of executed database application 156 and in accordance with application model 226B. In some instances, the discrete or sequential programmatic actions may include, but are not limited to, a sequence of discrete, programmatic inputs to the GUI or digital portal (e.g., keystrokes, selection of corresponding interface elements within menus, etc.) that select and extract specified elements of the tabular data from each of the converted files (e.g., via an invocation of a "cut" or "copy" functionality of the GUI or database application 156), that populate the specified elements of the resource template file with the elements of tabular data (e.g., via a corresponding "paste" operation into the specified elements of the resource template file), and that store the populated database file in the second format (e.g., via an invocation of a "save" functionality of the GUI or database application 156).

Figure 2C:
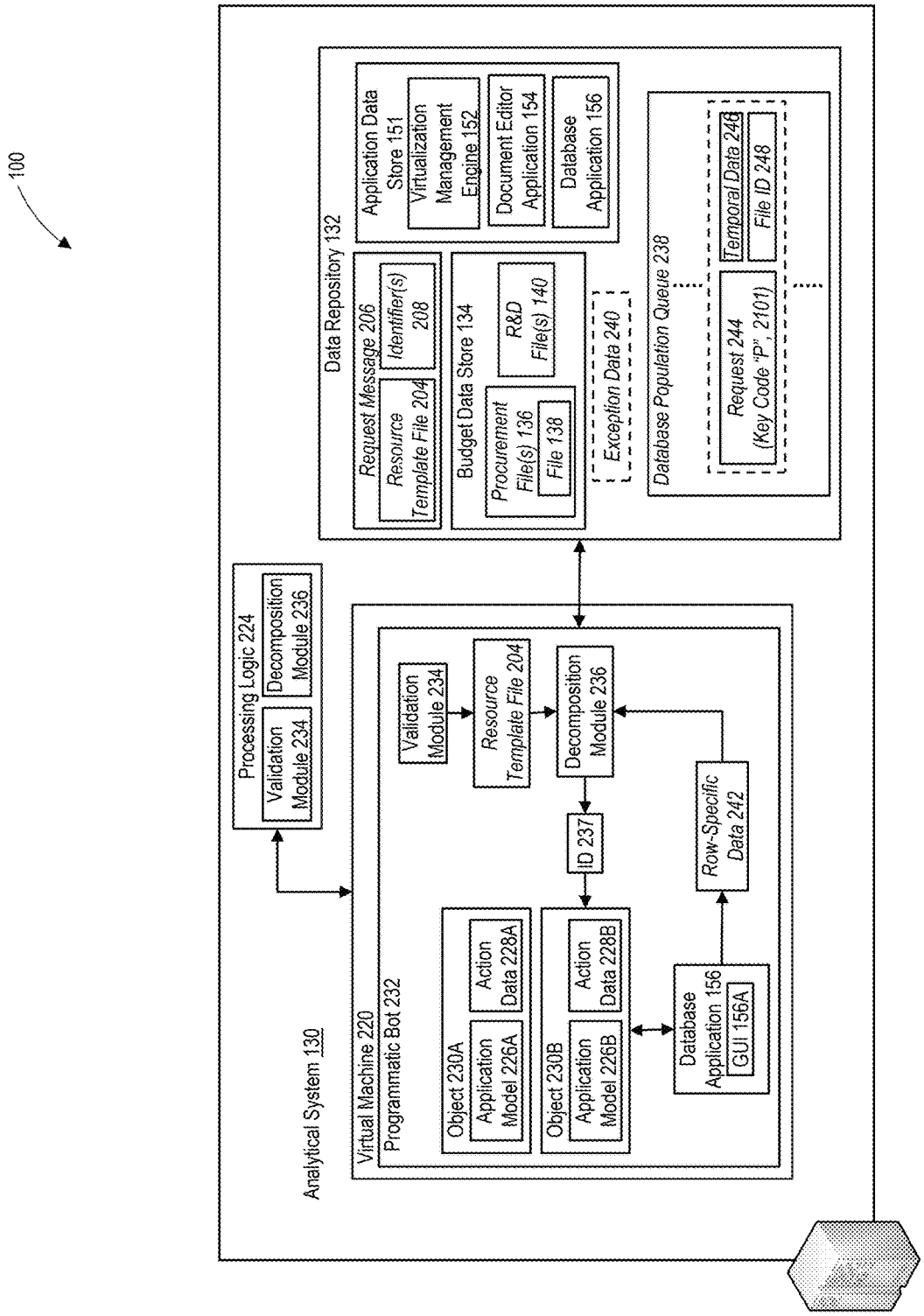
FIGS. 2C and 3A are block diagrams illustrating portions of an exemplary computing environment, in accordance with some exemplary embodiments.

Referring to FIG. 2C, the one or more elements of processing logic 224 may cause executed programmatic bot 232 to perform operations that obtain, from data repository 132, request message 206, includes resource template file 204 and identifiers 208 (e.g., based on operations performed programmatically by virtual machine 220 in conjunction with executed virtualization management engine 152). In some instances, and consistent with the one or more elements of processing logic 224, a validation module 234 of executed programmatic bot 232 may perform operations that extract identifiers 208 of user 101, client device 102, and/or executed email application 108 from request message 206, and may perform operations that, based on locally maintained identifiers of user 101, client device 102, and/or executed email application 108, validate an identity of user 101 (e.g., based on a comparison of an authentication credential of user 101, as maintained within identifiers 208, and one or more authentications credentials maintained locally within data repository 132, etc.) and additionally, or alternatively, an identity of client device 102 or executed email application 108 (e.g., based on a comparison between corresponding ones of identifiers 208 (e.g., the IP or MAC address of client device 102, the application cryptogram or digital token of executed email application 108) and device- or program-specific identifiers maintained within data repository 132, etc.). Further, executed validation module 234 may also perform operations that confirm request message 206 includes an appropriate, formatted template file, e.g., resource template file 204 structured in an Excel™ format.

If, for example, executed validation module 234 were unable to validate the identity of user 101, the identity of client device 102, or the identity of executed email application 108, or if executed validation module 234 were to determine that request message 206 fails to include the appropriate formatted template file, executed validation module 234 may establish that request message 206 corresponds to an invalid request. Executed validation module 234 may perform operations (not illustrated in FIG. 2C) that generate an error message confirming the failure of the validation process, which analytical system 130 may transmit across network 120 (e.g., based on operations performed programmatically by virtual machine 220 in conjunction with executed virtualization management engine 152). In some instances, the transmitted error message may correspond to an email message structured in accordance with one or more email-based communications protocols, upon transmission of the error message, virtual machine 220 may cause analytical system 130 to discard request message 206.

Alternatively, if executed validation module 234 were to validate successfully the identity of user 101, client device 102, or executed email application 108, and if executed validation module 234 were to determine that request message 206 includes the formatted template file, executed validation module 234 may determine that request message corresponds to a valid request, and executed validation module 234 may obtain resource template file 204 from request message 206, and provide resource template file 204 as an input to a decomposition module 236 of executed programmatic bot 232. Consistent with the one or more elements of processing logic 224, executed decomposition module 236 may perform operations that cause the one or more processors of analytical system 130 to access and execute database application 156, and that cause executable object 230B to access resource template file 204 via executed database application 156 (e.g., via a corresponding file name or identifier 237), and to provide programmatic input (e.g., consistent with application model 226B and the elements of action data 228B) to a GUI 156A of database application 156 that obtains, from each row of resource template file 204 (including rows disposed within the procurement- and R&D-specific partitions), a corresponding row number, one or more keywords characterizing the corresponding appropriation (e.g., a value of an appropriation identifier, an identifier of the budget activity associated with the appropriation, and an identifier of the budget sub activity associated with the appropriation), and an alphanumeric program code and title of the appropriation (e.g., based on a programmatic invocation of a "copy" functionality of GUI 156A and executed database application 156).

Executable object 230B may provision, or return, the keywords (e.g. the value of the appropriation identifier, the identifier of the budget activity associated with the appropriation, and the identifier of the budget sub-activity associated with the appropriation), the alphanumeric program code, and the title of the appropriation obtained from each row of resource template file 204 to executed decomposition module 236. In some instances, for each row of resource template file 204, executed decomposition module 236 may perform operations that determine whether one or more of the keywords, the program code, or the corresponding title are missing from the corresponding row of resource template file 204. For example, if executed decomposition module 236 were to determine that one or more of the keywords, the program code, or the corresponding title are missing from the corresponding row of resource template file 204, executed decomposition module 236 may perform operations, consistent with the elements of processing logic 224, that generate one or more elements of exception data that include the row identifier of the corresponding row and data identifying the missing keywords, program code, or corresponding title, and that store the elements of exception data 240 within a corresponding portion of data repository 132 (e.g., based on operations performed programmatically by virtual machine 220 in conjunction with executed virtualization management engine 152).

Alternatively, if executed decomposition module 236 were to determine that each of the keywords, the program code, and the corresponding title are present within the corresponding row of resource template file 204, executed decomposition module 236 may generate an appropriate procurement- or R&D-specific key code based on the value of the application identifiers extracted from the corresponding row by executable object 230B (e.g., a key code having a value of "P" associating the corresponding row with a procurement appropriation, or a key code having a value of "R" associating the corresponding row with a R&D appropriation, etc.). In some instances, executed decomposition module 236 may perform operations, consistent with the elements of processing logic 224, that generate a database population request for the corresponding row that includes the generate key code and the program code obtained from the corresponding row by executable object 230B. Executed decomposition module 236 may perform operations that store the database population request at a corresponding position within a database population queue 238, along with, and in accordance with, elements of temporal data that characterizes the time or date of receipt of request message 206 at analytical system 130 and an identifier of resource template file 204 (e.g., a point to a storage location of resource template file 204 within data repository 132). Further, and consistent with the elements of processing logic 224, executed decomposition module 236 may perform any of the exemplary processes described herein, in conjunction with executable object 230B, to generate, and maintain at a corresponding position within database population queue 238, a database population request associated with each additional, or alternate, row of resource template file 204 (and further, within each procurement- or R&D specific partition or workbook of resource template file 204). In some instances, database population queue 238, and each of the discrete database population requests, may be maintained within the one or more tangible, non-transitory memories of analytical system 130, e.g., within a portion of data repository 132.

By way of example, and using any of the exemplary processes described herein, executable object 230B may provision programmatic input to GUI 156A of executed database application 156 (e.g., in accordance with the elements of processing logic 224, and with application model 226B and the elements of action data 228B) that accesses rows 210 of resource template file 204, which characterize the requested appropriation of the Tomahawk missiles during the budget cycle for fiscal year 2024, and which are associated, respectively, with (i) the quantities of Tomahawk missiles subject to procurement during the current budget cycle for fiscal year 2024, projected for procurement during fiscal years 2025, 2026, 2027, and 2028, and actually procured during prior fiscal years 2022 and 2023 (e.g., row 210A), and (ii) the total obligation authority, in millions of dollars, of the projected or actual procurement of Tomahawk missiles during each of these fiscal years (e.g., row 210B). In some instances, based on the programmatic input provisioned to GUI 156A of executed database application 156, executable object 230B may obtain, from rows 210 of resource template file 204, corresponding row identifiers, one or more keywords of the appropriation, and the alphanumeric program code and title of the appropriation (e.g., "2101/Tomahawk"), e.g., based on a programmatic invocation of a "copy" command within GUI 156A. As described herein, the one or more keywords may include, but are not limited to, the appropriation identifier (e.g., "1109N: Procurement, Marine Corps"), the identifier of the budget activity associated with the appropriation (e.g., "BA 03: Guided Missiles and equipment"), and the identifier of the budget sub activity associated with the appropriation (e.g., "BSA 1: Guided Missiles").

As illustrated in FIG. 2B, executable object 230B may provision or return the elements of row-specific data 242 obtained from rows 210 to executed decomposition module 236, and based on the elements of row-specific data 242, executed decomposition module 236 may perform any of the exemplary processes described herein to operations that determine whether one or more of the keywords, the program code, or the corresponding title are missing from rows 210 of resource template file 204. For example, if executed decomposition module 236 were to determine that one or more of the keywords, the program code, or the corresponding title are missing from the rows 210 based on the elements of row-specific data 242, executed decomposition module 236 may perform operations, consistent with the elements of processing logic 224 and as described herein, that generate one or more additional elements of exception data 240 that include the row identifiers of rows 210 and data identifying the missing keywords, program code, or corresponding title, and that store the additional elements of exception data 240 within the corresponding portion of data repository 132.

Alternatively, if executed decomposition module 236 were to determine that each of the keywords, the program code, or the corresponding title are present within the rows 210 resource template file 204 based on the elements of row-specific data 242, executed decomposition module 236 may generate an appropriate procurement- or R&D-specific key code based on the value of the appropriation identifier extracted from rows 210. For example, the elements of row-specific data 242 may specify a value of "1109N: Procurement, Marine Corps" for the appropriation identifier and a value of "2101/Tomahawk" for program code and title of the appropriation. Based on the value "1109N: Procurement, Marine Corps" of the appropriation identifier, executed decomposition module 236 may perform any of the exemplary processes described herein to generate, and assign to rows 210, a procurement-specific key code having a value of "P." As described herein, executed decomposition module 236 may perform operations, consistent with the elements of processing logic 224, that generate a database population request 244 for rows 210 that include the generated, procurement-specific key code (e.g., "P") and the program code and title of "2101/Tomahawk" maintained within the elements of row-specific data 242.

In some instances, executed decomposition module 236 may perform any of the exemplary processes described herein to store database population request 244 at a corresponding position within database population queue 238, along with, and in accordance with, the elements of temporal data that characterizing the time or date of receipt of request message 206 at analytical system 130, e.g., temporal data 246, and the identifier of resource template file 204, e.g., identifier 248. Further, and consistent with the elements of processing logic 224, executed decomposition module 236 may perform any of the exemplary processes described herein, in conjunction with executable object 230B, to generate, and maintain at a corresponding position within database population queue 238, a database population request associated with each additional, or alternate, row of resource template file 204 (e.g., as maintained within each procurement- or R&D specific partition or workbook of resource template file 204). In some instances, database population queue 238, including discrete database population request 244 and each additional, or alternate, discrete database population requests, may be maintained within the one or more tangible, non-transitory memories of analytical system 130, e.g., within a portion of data repository 132.

Further, in some examples, one or more of the programmatic bots executed by virtual machine 220, such as executed programmatic bot 232, may perform operations, consistent with the elements of processing logic 224, that for each of the queued database population requests maintained within database population queue 238, identify one or more resource summary tables maintained within corresponding ones of procurement files 136 and/or R&D files 140 that include a specified keyword (e.g., the term "Resource Summary") and the corresponding program code, extract the one or more identified resource summary table (e.g., in a first format, such as a PDF format) and convert the one or more resource summary tables into files having a second format (e.g., an Excel™ format), and populate the table-specific rows of resource template file 204 associated with each of the database population requests with corresponding portions of the converted files. The one or more of the executed, programmatic bots, such as executed programmatic bot 232, may also perform operations, consistent with the elements of processing logic 224, that generate a populated database file (e.g., structured in the second format) based on the population of the table-specific rows of resource template file 204 with the corresponding portions of the converted files, and that transmit, to client device 102 across network 120, a response to request message 206 that includes the populated database file in some instances, one or more generated elements of exception data, as described herein.

Figure 3A:
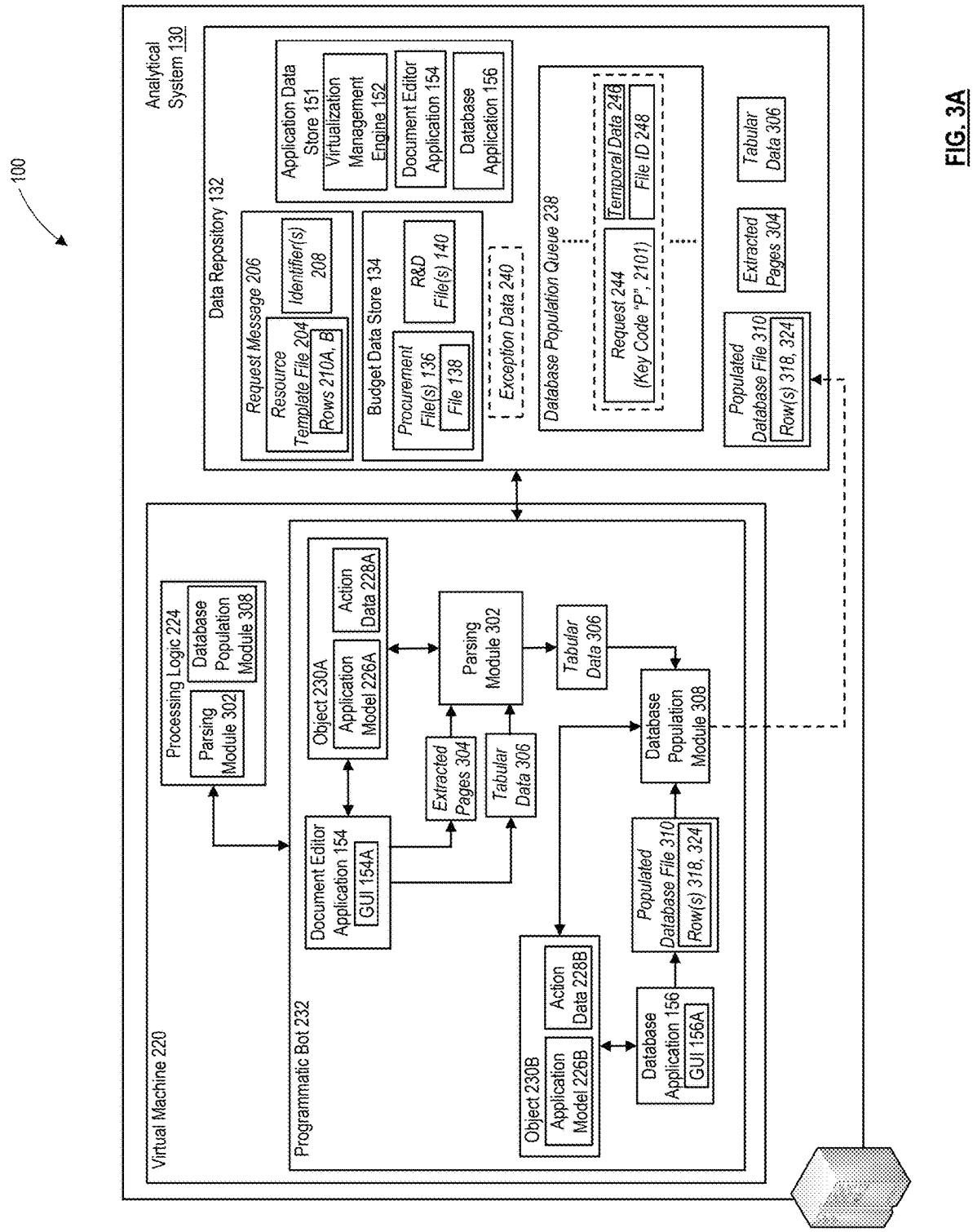

Referring to FIG. 3A, and consistent with the elements of processing logic 224, a parsing module 302 of executed programmatic bot 232 may access database population queue 238 maintained within data repository 132 (e.g., based on operations performed programmatically by virtual machine 220 in conjunction with executed virtualization management engine 152), and may select a corresponding one of the queued database population requests for further processing using any of the exemplary processes described herein. For example, executed parsing module 302 may select database population request 244, which may be associated with the requested appropriation of the Tomahawk missiles during the budget cycle for fiscal year 2024, and which includes the procurement-specific key code "P" and the corresponding program code "2101." In some instances, based on the procurement-specific key code "P," executed parsing module 302 may determine that database population request 244 corresponds to procurement appropriation, and may perform operations, consistent with the elements of processing logic 224, that access each of procurement files 136, including procurement file 138, maintained within budget data store 134 of data repository 132 (e.g., based on operations performed programmatically by virtual machine 220 in conjunction with executed virtualization management engine 152).

As described herein, each of procurement files 136, including procurement file 138, may be structured in accordance with a first format, such as a PDF format, and executed parsing module 302 may perform operations, consistent with the elements of with processing logic 224, that cause the one or more processors of analytical system 130 to access and execute document editor application 154, which may be associated with each of procurement files 136 (structured as PDFs, etc.). In some instances, executed parsing module 302 may provision a corresponding one of procurement files 136, such as procurement file 138, as an input to executed document editor application 154, and may provision the value of the program code and title maintained within database population request 244, e.g., "2101/Tomahawk," to executable object 230. Executed parsing module 302 may also perform operations that cause executable object 230A to access procurement file 138 within a GUI 154A of executed document editor application 154, and to provide programmatic input (e.g., consistent with application model 226A and the elements of action data 228A) to GUI 154A that searches one or more pages of procurement file 138 to identify corresponding pages that include the phrase "Resource Summary" and the program code and title, e.g., "2101/Tomahawk." The programmatic input may, for example, include one or more keystrokes that, when provisioned to GUI 154A by executable object 230A, initiate a keyword search, populate a corresponding search interface (e.g., a pop-up within GUI 154A) with the phrase "Resource Summary" and the program code and title "2101/Tomahawk," and that cause executed document editor application 154 to execute the keyword search in accordance with the populated search interface.

By way of example, based on the initiated search, executed document editor application 154 may identify one or more pages 304 of procurement file 138 that include a resource data table, such as, but not limited to, resource summary table 142 of FIG. 1B, that includes the term "Resource Summary" (e.g., in portion 148) and program code and title "2101/Tomahawk" (e.g., in portion 146). In some instances, and in accordance with the elements of processing logic 224, executed parsing module 302 may perform operations that cause executable object 230A to provide additional programmatic input (e.g., consistent with application model 226A and the elements of action data 228A) to GUI 154A that causes executed document editor application 154 to extract the identified pages, which include resource summary table 142, as a separate document structured in a format consistent with procurement file 138 (e.g., in PDF form). For example, the additional programmatic input provisioned to GUI 154A by executed object 230A (e.g., in accordance with application model 226A and the elements of action data 228A) may cause executed document editor application 154 to select each of identified pages 304 and extract identified pages 304 as the separate document, such as extracted pages 304, e.g., based on a programmatic invocation of an extract functionality of GUI 154A and executed document editor application 154. Executed parsing module 302 may perform operations, consistent with the elements of processing logic 224, that store now-extracted pages 304 within a corresponding portion of data repository 132 (not illustrated in FIG. 3A).

In some instances, executed parsing module 302 may also perform operations that cause executed object 230A to provide further programmatic input (e.g., consistent with application model 226A and the elements of action data 228A) to GUI 154A that causes executed document editor application 154 to access extracted pages 304 (e.g., in PDF form), and to convert extracted pages 304 into elements of tabular data 306, which may be structured in an format consistent with, and accessible by, database application 156 (e.g., in Microsoft Excel™ format, in XLM™ format, etc.). By way of example, the further programmatic input, when provisioned to GUI 154A by executed object 230A, may cause executed document editor application 154 to open extracted pages 304 as a separate document, and to export the separate document into the elements of tabular data 306, e.g., based on an invocation of an export functionality or a local-save functionality of GUI 154A and executed document editor application 154. Although not illustrated in FIG. 3A, executed parsing module 302 may perform operations, consistent with the elements of processing logic 224, that store the elements of tabular data 306 within a corresponding portion of data repository 132.

Executed parsing module 302 may also provide the elements of tabular data 306, which may include a representation of the elements of data maintained within resource summary table 142 of extracted pages 304 in tabular form, as input to a database population module 308 of executed programmatic bot 232. In some instances, executed database population module 308 may perform operations, consistent with the elements of processing logic 224, that access the rows of resource template file 204 associated with resource summary table 142 and including program code and title "2101/Tomahawk" (e.g., rows 210A and 210B) maintained within data repository 132, that populate one or more empty columns of the accessed rows of resource template file 204 with data obtained from corresponding one of the elements of tabular data 306, and that generate a populated database file 310 that includes, among other things, the now-populated columns of rows 210A and 210B associated with the resource summary table 142 (e.g., that characterize the requested appropriation of the Tomahawk missiles during the budget cycle for fiscal year 2024) and referencing program code and title "2101/Tomahawk."

For example, and in accordance with the elements of processing logic 224, executed database population module 308 may perform operations that cause the one or more processors of analytical system 130 (e.g., via virtual machine 220) to execute database application 156 and that trigger an execution of object 230B (e.g., by executed programmatic bot 232 based on programmatically generated instructions, etc.). In some instances, executed database population module 308 may also perform operations, in accordance with the elements of processing logic 224, that cause executed object 230B to provide programmatic input (e.g., consistent with application model 226B and the elements of action data 228B) to GUI 156A of executed database application 156, which may cause executed database application 156 to access, and open for editing within GUI 156A, each of resource template file 204 and tabular data 306.

As described herein, resource template file 204 may be structured in a format consistent with executed database application 156 (e.g., in Microsoft Excel™ format, in XML™ format, etc.), and may include procurement-specific partition 204A having rows 210 associated with one or more of the line items maintained within resource summary table 142 (and represented by elements of tabular data 306). By way of example, rows 210 may include a discrete row 210A associated with the quantities of Tomahawk missiles subject to procurement during the current budget cycle for fiscal year 2024, projected for procurement during outyears 2025, 2026, 2027, and 2028, and actually procured during prior fiscal years 2022 and 2023, and a discrete row 210B associated with a total obligation authority, in millions of dollars, of the projected or actual procurement of Tomahawk missiles during each of these fiscal years. As described herein, each of rows 210A and 210B may include columns of data specifying corresponding ones of the keywords of the appropriation, such as, but not limited to, appropriation identifier (e.g., "1109N: Procurement, Marine Corps"), the identifier of the budget activity associated with the appropriation (e.g., "BA 03: Guided Missiles and equipment"), and the identifier of the budget sub activity associated with the appropriation (e.g., "BSA 1: Guided Missiles"), and an additional column specifying corresponding ones of alphanumeric program code and title of the appropriation (e.g., "2101/Tomahawk"). Further, each of each of rows 210A and 210B may include additional columns storing empty values (e.g., columns 212 of FIG. 2B associated with fiscal years 2022, 2023, 2024, 2025, 2026, 2027, and 2028), which may be populated with corresponding values of the procurement quantity and total obligation authority from resource summary table 142 maintained within tabular data 306 using any of the exemplary processes described herein.

Figure 3B:
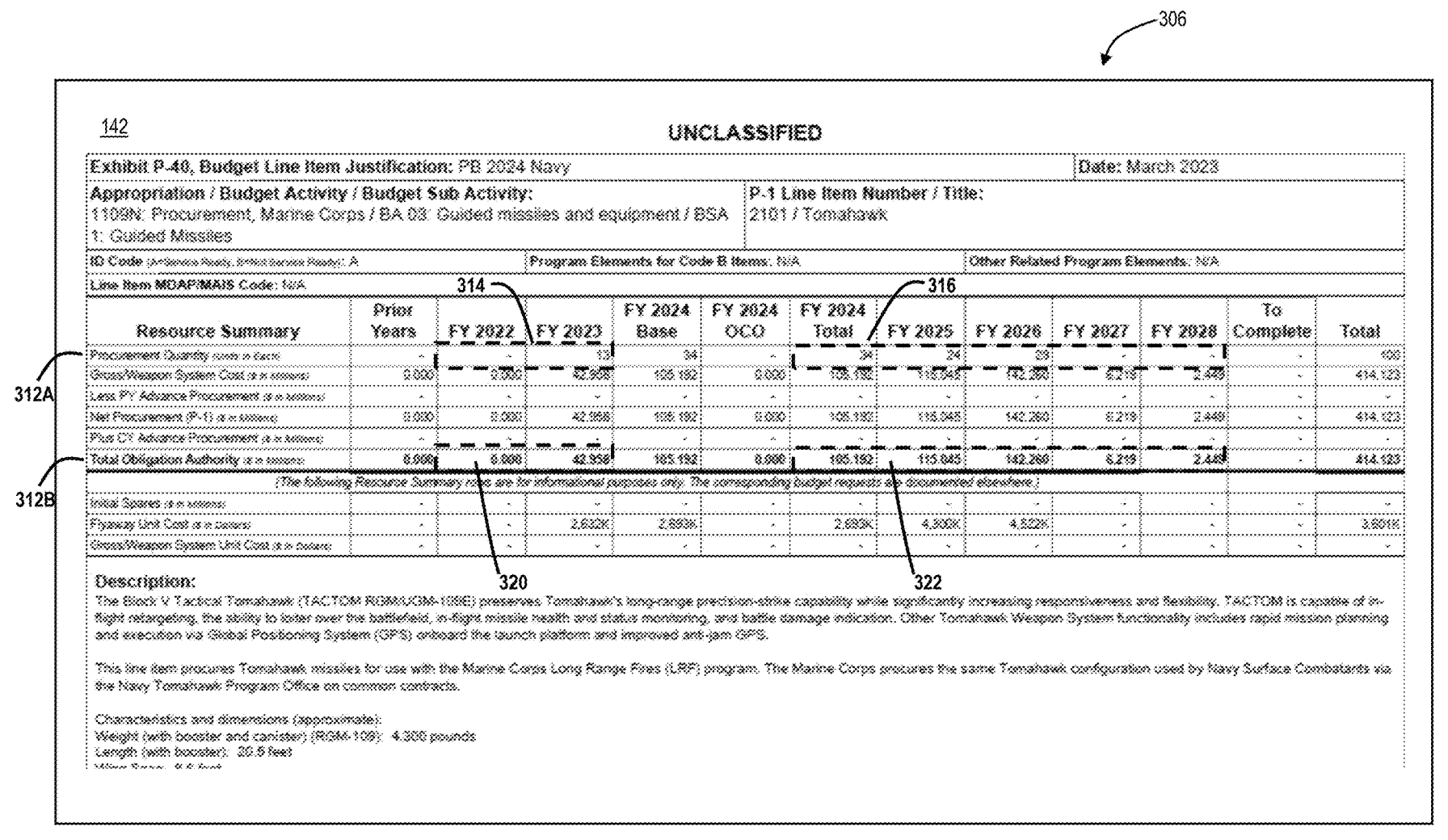

Referring back to FIG. 3A, executed database population module 308 may perform operations, in accordance with the elements of processing logic 224, that cause executed object 230B to provide additional programmatic input (e.g., consistent with application model 226B and the elements of action data 228B) to GUI 156A, which causes executed database application 156 to access tabular data 306 and identify, within tabular data 306, a corresponding row within resource summary table 142 that associated with a procurement quantity of the tomahawk missiles, e.g., based on an invocation of a keyword search functionality of GUI 156A and executed database application 156 using the phrase "Procurement Quantity." For example, as illustrated in FIG. 3B, executed database application 156 may select, responsive to the additional programmatic input, row 312A of tabular data 306 associated with the procurement quantity of the Tomahawk missiles during fiscal years 2022, 2023, 2024, 2025, 2026, 2027, and 2028. In some instances, and in accordance with the elements of processing logic 224, executed object 230B provides further programmatic input (e.g., consistent with application model 226B and the elements of action data 228B) to GUI 156A that causes executed database application 156 to select, within row 312A, values 314 of the procurement quantities during fiscal years 2022 and 2023 (e.g., zero and thirteen, respectively), and values 316 of the procurement quantities during fiscal years 2024, 2025, 2026, 2027, and 2028 (e.g., thirty-four, twenty-four, twenty-nine, zero, and zero, respectively), and extract values 314 and 316 from tabular data 306 (e.g., based on a programmatic invocation of a "copy" functionality of GUI 156A and executed database application 156).

Further, in accordance with the elements of processing logic 224, executed database population module 308 may perform operations that cause executed object 230B to provide programmatic input (e.g., consistent with application model 226B and the elements of action data 228B) to GUI 156A, which causes executed database application 156 to access resource template file 204 within data repository 132 and identify a corresponding row of resource template file 204 associated with the procurement quantity of the Tomahawk missiles, such as row 210B (e.g., based on an invocation of a keyword search functionality of GUI 156A and executed database application 156 using the program code and appropriation title "2101/Tomahawk" and parameter identifier "QTY"). Further, in accordance with the elements of processing logic 224, executed object 230B to provide additional programmatic input to GUI 156A that causes executed database application 156 to populate corresponding ones of the empty columns within row 210B, such as columns 212, with respective ones of extracted values 314 and 316 (e.g., based on a programmatic invocation of a "paste" functionality of GUI 156A and executed database application 156).

Figure 3C:
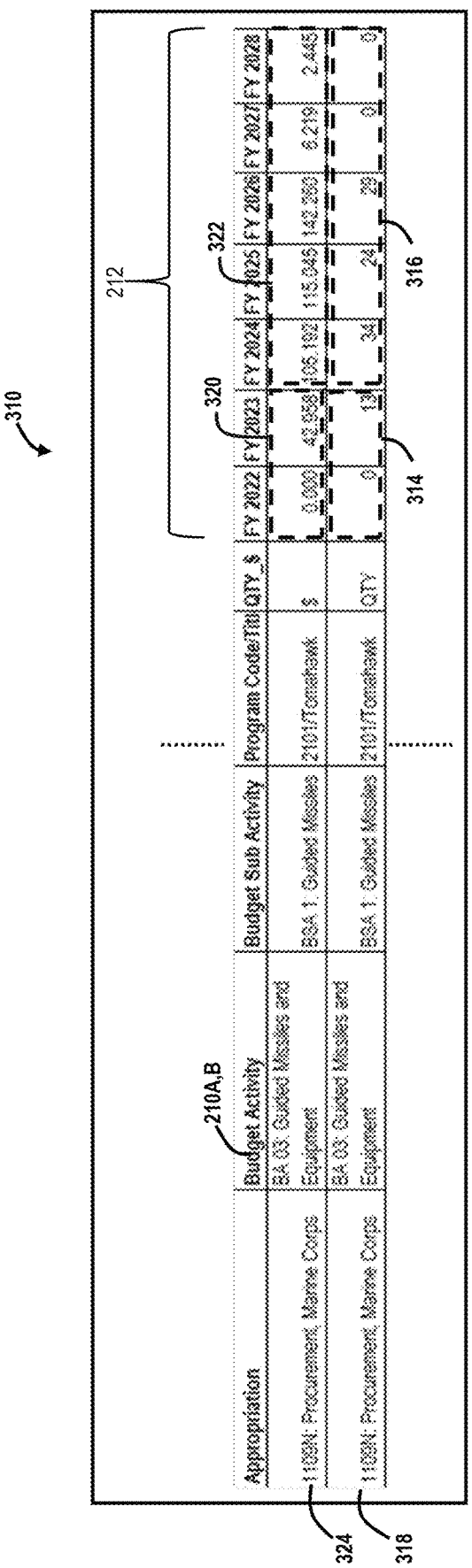
FIG. 3C is a diagram illustrating a portion of an exemplary populated database file, in accordance with some exemplary embodiments.

For example, as illustrated in FIG. 3C, executed database application 156 may perform operations, described herein in response to the additional programmatic input of executed object 230B, that populate the empty columns of row 210B associated with prior fiscal years 2022 and 2023 with respective ones of values 314 (e.g., values of zero and thirteen), and that populate the empty columns of row 210B associated with fiscal year 2024 and outyears 2025, 2026, 2027, and 2028 with respective ones of values 316 (e.g., values of thirty-four, twenty-four, twenty-nine, zero, and zero, respectively). In some instances, the additional programmatic input provisioned by executed object 230B may also cause executed database application 156 to store a copy of resource template file 204, including now-populated row 210B, within the one or more tangible, non-transitory memories of analytical system 130, e.g., as populated database file 310 within data repository 132 based on a programmatic invocation of a "save" functionality of GUI 156A and executed database application 156. As described herein, now-populated row 210B of resource template file may correspond to, and represent, a populated row 318 of populated database file 310.

Referring back to FIG. 3A, executed database population module 308 may perform operations, in accordance with the elements of processing logic 224, that cause executed object 230B to provide further programmatic input (e.g., consistent with application model 226B and the elements of action data 228B) to GUI 156A, which causes executed database application 156 to re-access tabular data 306 and identify, within tabular data 306, a corresponding row within resource summary table 142 characterizing a total obligation authority associated with the requested procurement of the tomahawk missiles, e.g., based on an invocation of a keyword search functionality of GUI 156A and executed database application 156 using the phrase "Total Obligation Authority." For example, as illustrated in FIG. 3B, executed database application 156 may select, responsive to the further programmatic input, row 312B of tabular data 306 characterizing the total obligation authority, in millions of dollars associated with the requested procurement of the Tomahawk missiles during fiscal years 2022, 2023, 2024, 2025, 2026, 2027, and 2028. In some instances, and in accordance with the elements of processing logic 224, executed object 230B provides programmatic input (e.g., consistent with application model 226B and the elements of action data 228B) to GUI 156A that causes executed database application 156 to select, within row 312A, values 320 of the total obligation authority during fiscal years 2022 and 2023 (e.g., $0.000 million and $42.985 million, respectively), and values 322 of the total obligation authority during fiscal years 2024, 2025, 2026, 2027, and 2028 (e.g., $105.192 million, $115.045 million, $142.260 million, $6.219 million, and $2.449 million, respectively), and to extract values 314 and 316 from tabular data 306 (e.g., based on a programmatic invocation of a "copy" functionality of GUI 156A and executed database application 156).

In accordance with the elements of processing logic 224, executed database population module 308 may perform operations that cause executed object 230B to provide additional programmatic input (e.g., consistent with application model 226B and the elements of action data 228B) to GUI 156A, which causes executed database application 156 to access populated database file 310, which includes now-populated row 318 characterizing the procurement quantity of the tomahawk missiles and unpopulated row 210A characterizing the total obligation authority associated with the requested procurement of the tomahawk missiles. In some instances, the additional programmatic input provided by executed object 230B may also cause executed database application 156 to identify the corresponding row of populated database file 310 characterizing the total obligation authority associated with the requested procurement of the tomahawk missiles, such as unpopulated row 210A (e.g., based on an invocation of a keyword search functionality of GUI 156A and executed database application 156 using the program code and appropriation title "2101/Tomahawk" and parameter identifier "$").

Further, and in accordance with the elements of processing logic 224, executed object 230B may provide further programmatic input to GUI 156A that causes executed database application 156 to populate corresponding ones of the empty columns within row 210A, such as columns 212, with respective ones of extracted values 320 and 322 (e.g., based on a programmatic invocation of a "paste" functionality of GUI 156A and executed database application 156). For example, as illustrated in FIG. 3C, executed database application 156 may perform operations, described herein in response to the further programmatic input of executed object 230B, that populate the empty columns of row 210A associated with prior fiscal years 2022 and 2023 with respective ones of values 320 (e.g., $0.000 million and $42.985 million, respectively), that populate the empty columns of row 210A associated with fiscal year 2024 and outyears 2025, 2026, 2027, and 2028 with respective ones of values 316 (e.g., $105.192 million, $115.045 million, $142.260 million, $6.219 million, and $2.449 million, respectively), and that store a copy of populated database file 310, including now-populated rows 210A and 210B, within the one or more tangible, non-transitory memories of analytical system 130, e.g., within data repository 132 based on a programmatic invocation of a "save" functionality of GUI 156A and executed database application 156. As described herein, now-populated row 210A of resource template file may correspond to, and represent, a populated row 324 of populated database file 310.

In some examples, based on programmatic interactions between executed object 230A and GUI 154A of document editor application 154, and based on programmatic interactions between executed object 230B and GUI 156A of database application 156, executed programmatic bot 232 may perform one or more of the exemplary processes described herein, in accordance with the elements of processing logic 224. The exemplary processes may, for instance, include populating resource- and appropriation-specific rows of resource template file 204 with corresponding values of a procurement quantity and a total obligation authority characterizing (i) a requested procurement of Tomahawk missiles during a budgeting cycle associated with fiscal year 2024, (ii) an actual procurement of Tomahawk missiles during prior fiscal years 2022 and 2023, and (iii) a projected procurement of Tomahawk missiles during outyears 2025, 2026, 2027, and 2028. The corresponding values of a procurement quantity and a total obligation authority may be maintained within procurement file 138 in a format different from, and inconsistent with, a corresponding format of resource template file 204. The disclosed embodiments are, however, are not limited to processes that populate the appropriation- and resource-specific rows within the procurement-specific partition of resource template file 204 with corresponding values of the procurement quantity and the total obligation authority across fiscal years 2022, 2023, 2024, 2025, 2026, 2027, and 2028, and in other instances, rows 210 of resource template file 204 may identify additional, or alternate, parameters of the requested procurement of the Tomahawk missiles during a budgeting cycle associated with fiscal year 2024, such as, but not limited to, a value of a net procurement specified in portion 148 of resource summary table 142 of procurement file 138 for each, or a selected subset, of the fiscal years described herein. Executed programmatic bot 232 may, for example, perform any of the exemplary processes described herein (e.g., in accordance with the elements of processing logic 224 and in conjunction with executed objects 230A and 230B) to extract the values of the net procurement associated with each of the specified fiscal years from a corresponding row of tabular data 306, and to populate the empty columns of a corresponding one of rows 210 of resource template file 204 with respective ones of the extracted values of the net procurement, e.g., to establish an additional populated row of populated database file 310.

Further, and as described herein, executed programmatic bot 232 may perform operations that populate rows 210A and 210B of resource template file 204, and generate corresponding populated rows 318 and 324 of populated database file 310, based on corresponding values of the procurement quantity and total obligation authority maintained within resource summary table 142 of procurement file 138. The disclosed embodiments are, however, not limit to, processes that populate the rows of resource template file 204 based on data maintained within resource summary table 142 or within procurement file 138. By way of example, executed programmatic bot 232 may perform any of the exemplary processes described herein to populate rows 210A and 210B of resource template file 204, or any additional, or alternate, row of resource template file 204 associated with the requested procurement of the Tomahawk missiles during the budget cycle for fiscal year 2024, based on data specified within one or more additional resource summary tables (e.g., that include the phrase "Resource Summary" and the program code and title "2101/Tomahawk") maintained within procurement file 138 or within any additional, or alternate, one of procurement files 136. For instance, upon population of rows 210A and 210B of resource template file 204, and upon generation of populated database file 310 that includes populated rows 318 and 324, executed programmatic bot 232 may perform any of the exemplary processes described herein (e.g., in accordance with the elements of processing logic 224 and in conjunction with executed objects 230A and 230B) that identify an additional, or alternate, resource summary table associated with associated with the requested procurement of the Tomahawk missiles during the budget cycle for fiscal year 2024 within additional portions of procurement file 138, or within portions of one or more of procurement files 136, and that populate further, resource- and appropriation-specific rows of resource template file with corresponding parameter values extracted programmatically from the additional, or alternate, resource summary table.

In some examples, upon population of each of the rows of resource template file 204 associated with the requested procurement of the Tomahawk missiles during the budget cycle for fiscal year 2024 (e.g., rows 210A and 210B, etc.), and upon generation of populated database file 310 that includes the populated rows characterizing the requested procurement of the Tomahawk missiles during the budget cycle for fiscal year 2024 (e.g., populated rows 318 and 324, etc.), executed programmatic bot 232 may perform operations, consistent with the elements of processing logic 224, that access database population queue 238, and delete, from database population queue 238, database population request 244 associated with the requested procurement of the Tomahawk missiles during the budget cycle for fiscal year 2024 (e.g., based on a programmatic invocation of a corresponding "delete" command, etc.). Further, and consistent with the elements of processing logic 224, parsing module 302 of executed programmatic bot 232 may access database population queue 238 maintained within the one or more tangible, non-transitory memories of analytical system 130 (e.g., based on operations performed programmatically by virtual machine 220 in conjunction with executed virtualization management engine 152), and may select an additional one of the queued database population requests for further processing using any of the exemplary processes described herein.

By way of example, the additional one of the queued database population requests may characterize an additional procurement appropriation of a resource requested during the budget cycle for fiscal year 2024, and as described herein, the additional one of the queued database population may include a corresponding, procurement-specific key code (e.g., a value of "P") and a corresponding program code and title for the additional procurement appropriation. In some instances, based on programmatic interactions between executed object 230A and GUI 154A of document editor application 154, and based on programmatic interactions between executed object 230B and GUI 156A of database application 156, executed programmatic bot 232 may perform one or more of the exemplary processes described herein, in accordance with the elements of processing logic 224, that populate one or more rows maintained within a procurement-specific partition of resource template file 204 with corresponding, resource- and appropriation-specific parameter values maintained within one or more resource summary tables of procurement files 136.

In other examples, the additional one of the queued database population requests may characterize a R&D appropriation requested during the budget cycle for fiscal year 2024, and as described herein, the additional one of the queued database population may include a corresponding, R&D-specific key code (e.g., a value of "R") and a corresponding program code and title for the R&D appropriation. As described herein, a procurement-specific partition 204A of resource template file 204 may include discrete elements of tabular data (e.g., rows) associated with all, or a selected subset, of the resource summary tables maintained within procurement files 136, and a R&D-specific partition of resource template file 204 may include additional, discrete elements of tabular data (e.g., rows) associated with all, or a selected subset, of the resource summary tables maintained within R&D files 140 (e.g., within an additional partition of resource template file 204, such as a corresponding, R&D-specific "worksheet" of the Microsoft Excel™ file).

In some instances, executed programmatic bot 232 may perform any of the exemplary processes described herein (e.g., in accordance with the elements of processing logic 224 and in conjunction with executed object 230B) that access one or more of the rows maintained within the R&D-specific partition of resource template file 204 associated with the requested R&D appropriation, that generate the R&D-specific key code (e.g., the value of "R"), and that extract the corresponding program code and title of the requested R&D appropriation. Executed programmatic bot 232 may perform any of the exemplary processes described herein (e.g., in accordance with the elements of processing logic 224 and in conjunction with executed object 230B) that generate the additional one of the queued database population requests based on the R&D-specific key code and the corresponding program code and title, and that store additional one of the queued database population requests at a corresponding position within database population queue 238, e.g., in conjunction with temporal data 246 and identifier 248

Based on programmatic interactions between executed object 230A and GUI 154A of document editor application 154, and based on programmatic interactions between executed object 230B and GUI 156A of database application 156, executed programmatic bot 232 may perform one or more of the exemplary processes described herein, in accordance with the elements of processing logic 224, that populate the one or more rows of resource template file 204 associated with the requested R&D appropriation (e.g., maintained within R&D-specific partition of resource template file 204) with corresponding, resource- and appropriation-specific parameter values maintained within one or more resource summary tables of R&D files 140, and generate additional populated rows within a R&D-specific partition (e.g., a R&D-specific worksheet) of the populated database file 310 based on the now-populated rows of resource template file 204. Further, upon population of the rows of resource template file 204 associated with the requested R&D appropriation, and upon inclusion of these populated rows within the R&D-specific partition of populated database file 310, executed programmatic bot 232 may perform operations, consistent with the elements of processing logic 224, that access database population queue 238, that delete from database population queue 238 the additional one of the queued database population requests associated with the requested R&D appropriation, and that may select a further one of the queued database population requests for further processing using any of the exemplary processes described herein.

Figure 3D:
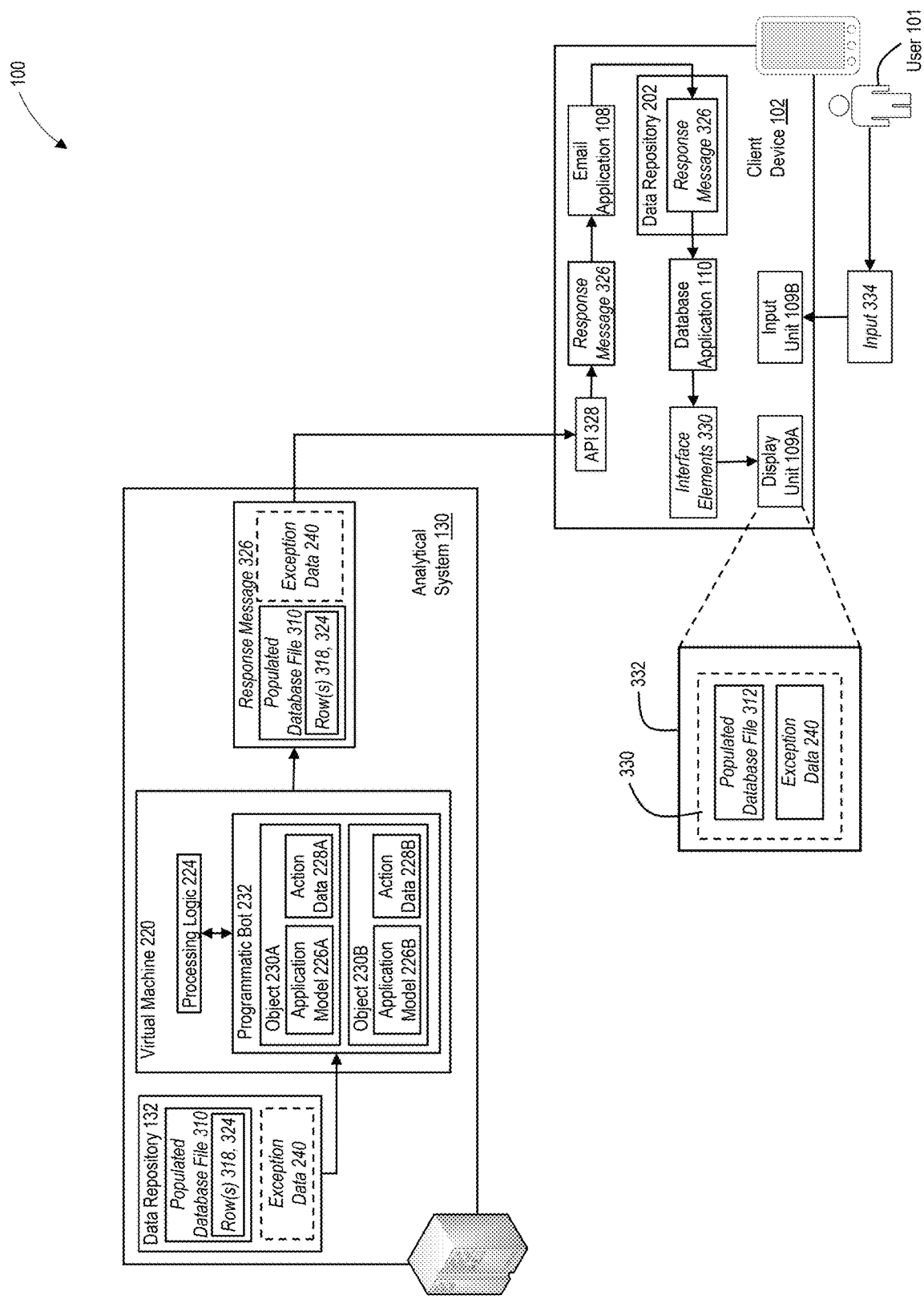
FIG. 3D is a block diagram illustrating portions of an exemplary computing environment, in accordance with some exemplary embodiments.

Referring to FIG. 3D, executed programmatic bot 232 may perform operations, consistent with the elements of processing logic 224, that access data repository 132, and obtain populated database file 310 associated with resource template file 204 and request message 206 (including populated rows 318 and 324 associated with database population request 244, and populated rows associated with each additional, or alternate, database population request maintained within database population queue 238), and in some instances, elements of exception data 240 generated while processing resource template file 204 (e.g., based on operations performed programmatically by virtual machine 220 in conjunction with executed virtualization management engine 152). In some instances, and consistent with the elements of processing logic 224, executed programmatic bot 232 may package populated database file 310 (and in some instances, the elements of exception data 240) into corresponding portions of a response message 326, which may respond to request message 206. Response message 326 may, for example, correspond to an email message structured in accordance with one or more email-based communications protocols, and as illustrated in FIG. 3D, executed programmatic bot 232 may perform operations, consistent with the elements of processing logic 224, that cause analytical system 130 to transmit response message 326, including populated database file 310 and in some instances, exception data 240, across network 120 to client device 102.

In some instances, a programmatic interface established and maintained by client device 102, such as application programming interface (API) 328 of email application 108, may receive response message 326, which includes populated database file 310 and in some instances, exception data 240, and may route response message 326 to email application 108, which may be executed by the one or more processors of client device 102 (e.g., processor 104). Executed email application 108 may, for example, store response message 326 within a corresponding portion of the one or more tangible memories of client device 102, such as within data repository 202. Further, as illustrated in FIG. 3D, executed database application 110, which may be configured to generate, modify, or operate on tabular data structured in a corresponding format (e.g., Microsoft Excel™ format, an XML™ format, etc.), may access populated database file 310 and in some instances, exception data 240, maintained within the elements of response message 326.

Executed database application 110 may generate interface elements 330 representing corresponding rows of populated database file 310, and in some instances, portions of exception data 240, and may provision interface elements 330 as inputs to display unit 109A. As illustrated in FIG. 3D, display unit 109A may present interface elements 330 to user 101 within one or more display screens of digital interface 332, and user 101 may interact with the rows of populated database file 310 and/or the portions of exception data 240 by provisioning input 334 to client device 102 via input unit 109B.

Figure 3E:
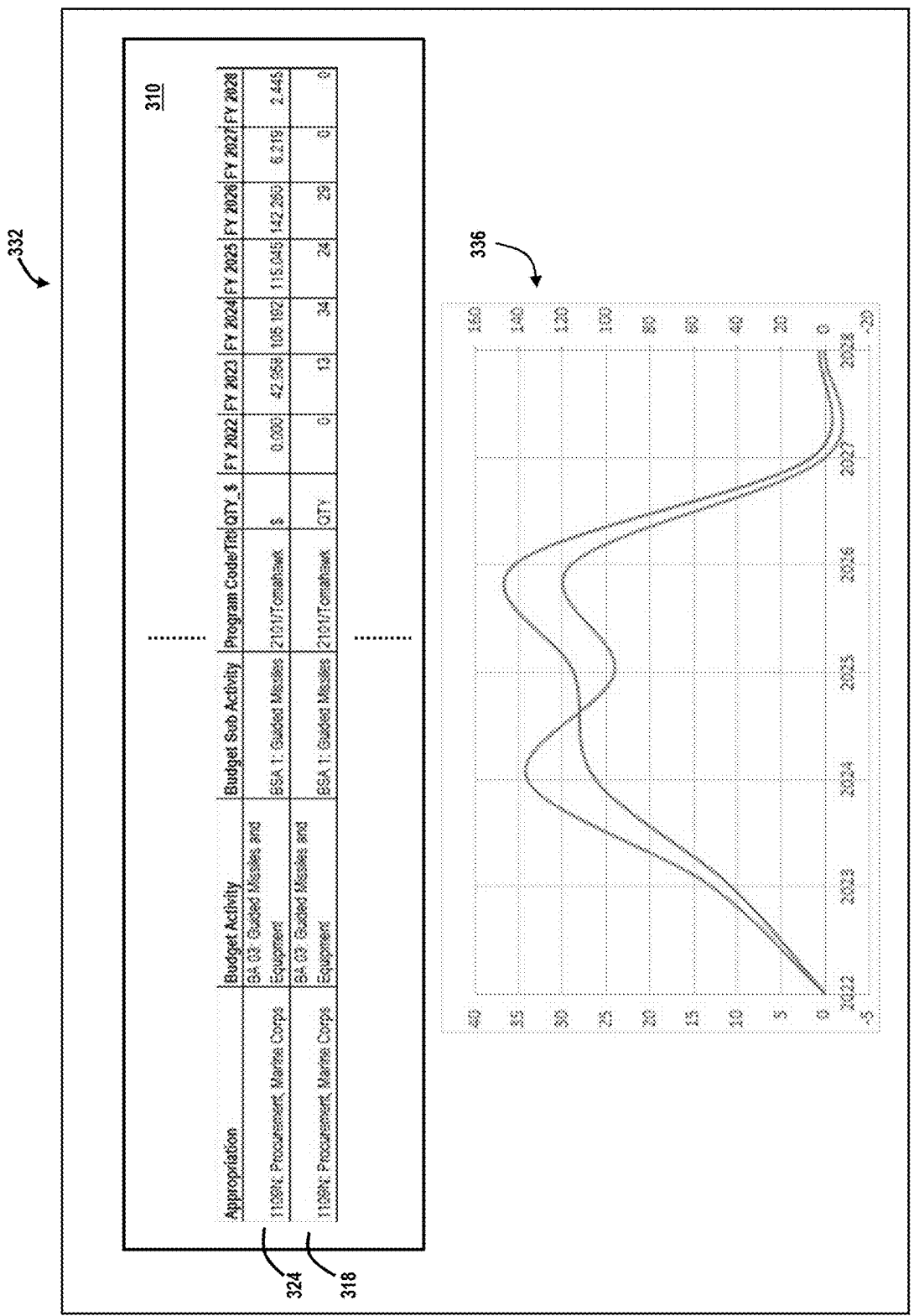
FIG. 3E is a diagram illustrating a portion of a digital interface, in accordance with some exemplary embodiments.

By way of example, as illustrated in FIG. 3E, digital interface 332 may present, to user 101, all or a selected portion of populated database file 310, such as, but not limited to, populated rows 318 and 324 that characterize, respectively, the requested appropriation for the Tomahawk missiles (e.g., associated with program code and title "2101/" Tomahawk") during the budget cycle associated with fiscal year 2024, the actual appropriations during prior fiscal years 2022 and 2023, and an expected impact of the requested, 2024 appropriation on outyears 2025, 2026, 2027, and 2028. Further, and based on additional input provisioned to client device 102 via input unit 109B, such as input 334, executed database application 110 may generate, and present within digital interface 332, a graphical representation 336 of the changes in the procured quantity of Tomahawk missing, and the total obligation authority associated with the procured quantity across between fiscal years 2022 and 2028.

Although not illustrated in FIG. 3E, digital interface 332 may also aggregate the parameter values that characterize the requested appropriation for the Tomahawk missiles during the budget cycle associated with fiscal year 2024 with additional data characterizing similar procurement or R&D programs over these fiscal years, and may present a graphical representation of a temporal evolution in the aggregated values, either alone or in comparison with the temporal evolution in the parameter values that characterize the requested appropriation for the Tomahawk missiles. Further, in some instances, temporal variation in the parameter values that characterize the requested appropriation for the Tomahawk missiles during the budget cycle associated with fiscal year, or the temporal variation in the aggregated values, may also be presented in conjunction with a similar temporal evolution of various parameters that characterize a supplier of the Tomahawk missiles (e.g., a corresponding, yearly revenue, profit/loss, etc.), a total budget for the DOD, or a budget for various subdivisions of the DoD.

Figure 4:
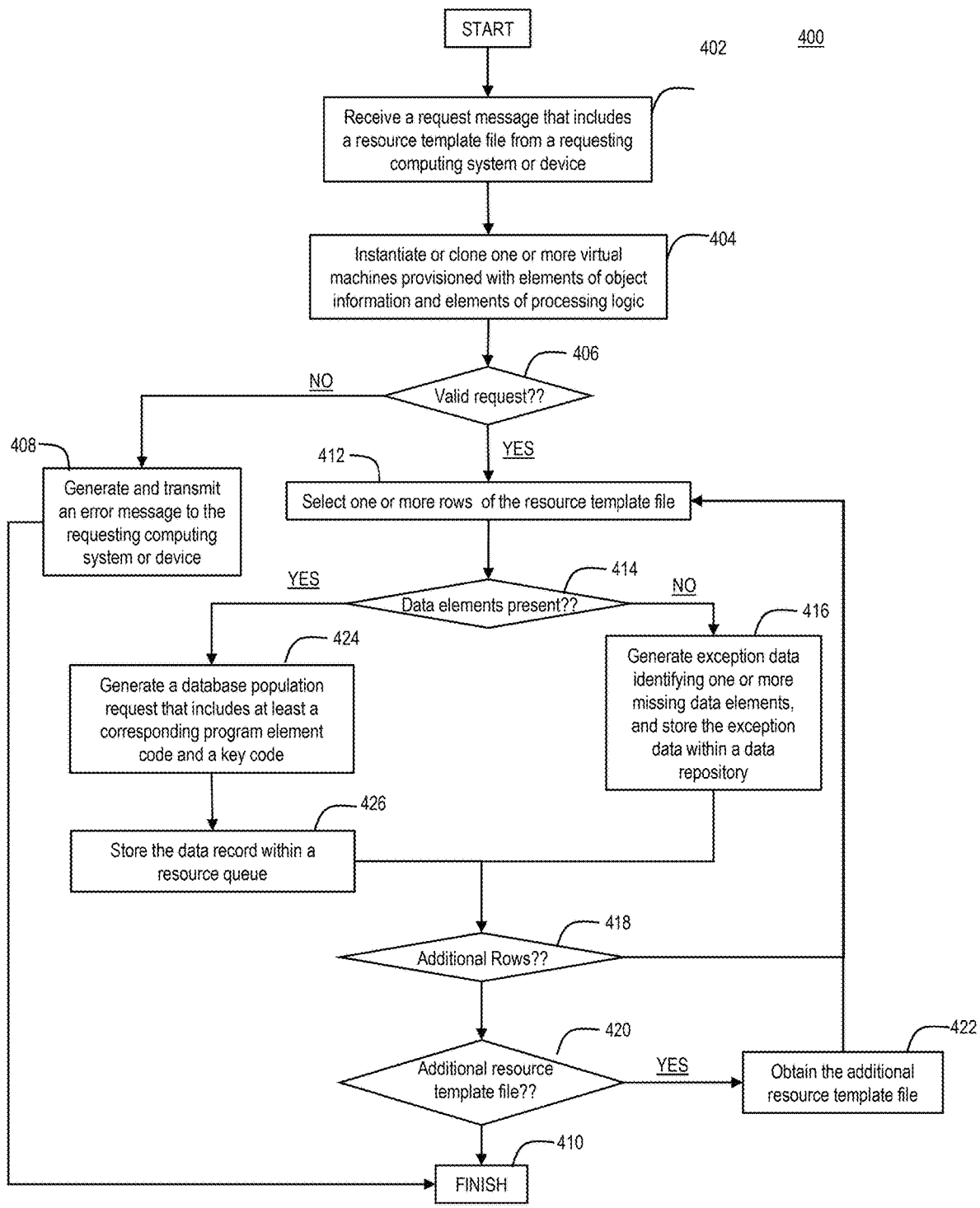
FIGS. 4 and 5 are flowcharts of exemplary processes for dynamically managing and populating databases using programmatic robotic processes, in accordance with some exemplary embodiments.
Figure 5:
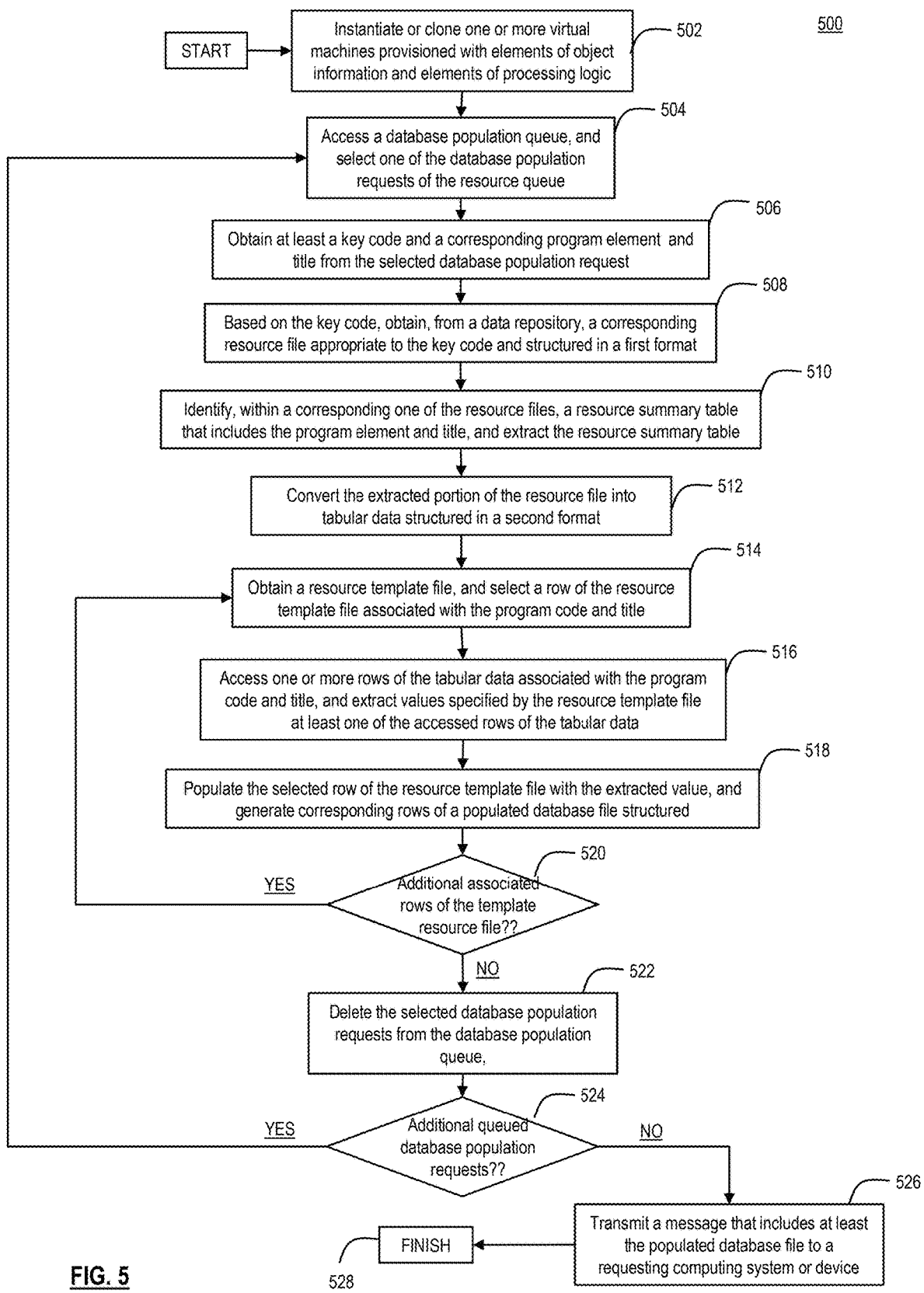

FIGS. 4 and 5 are flowcharts of exemplary processes for dynamically managing and populating databases using programmatic robotic processes, in accordance with disclosed exemplary embodiments. For example, a network-connected computing system operating within environment 100, such as analytical system 130, may perform one or more of the steps of exemplary process 400 of FIG. 4 and exemplary process 500 of FIG. 5, e.g., based on an execution of one or more programmatic robots executed by a virtual machine instantiated, or cloned, by analytical system 130, such as programmatic bot 232 executed by instantiated virtual machine 220, using any of the exemplary operations described herein.

Referring to FIG. 4, analytical system 130 may receive a request message from a computing system or device operating within computing environment 100, such as client device 102 (e.g., in step 402 of FIG. 4). As described herein, the received request message may include a resource template file and one or more identifiers of the computing system or device, a user associated with the computing system or device, and/or an application program executed by computing system or device, which may generate the request message. For example, the response message may correspond to an email message generated by email application 108 executed by the client device 102, and the resource template file and one or more identifiers may represent attachments to the email message. Further, although not illustrated in FIG. 4, analytical system 130 may perform operations that store the received request message, and the attached or included resource template file and identifiers, within a corresponding portion of a tangible, non-transitory memory, such as data repository 132.

Analytical system 130 may also perform any of the exemplary processes described herein to instantiate one or more virtual machines provisioned with elements of object information and elements of processing logic, and additionally, or alternatively, to clone one or more previously instantiated and provisioned virtual machines (e.g., in step 404 of FIG. 4). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each which includes a corresponding one of the generated executable objects. By way of example, and as described herein, the generated executable objects may include a first executable object (e.g., executable object 230A of FIG. 2A), which may be operable with, and configured to interact with, a graphical user interface of a first application program executed by analytical system 130 (e.g., GUI 154A of document editor application 154), and a second executable object, which may be operable with, and configured to interact with, a graphical user interface of a second application program executed by analytical system 130 (e.g., GUI 156A of database application 156).

In some instances, upon execution by analytical system 130, a programmatic bot established by a corresponding one of instantiated or cloned virtual machines may perform one or more of the exemplary processes described herein (e.g., in accordance with the provisioned elements of processing logic) to validate the request message based on the identifiers of the computing system or device, user, of the executed application program (e.g., in step 406 of FIG. 4). Further, in step 406, the executed programmatic bot may also perform operations, described herein and consistent with the provisioned elements of processing logic, that confirm a structure or format of the resource template file attached to, or included within, the received request message is compatible with, and interpretable by, one or more application programs executed by analytical system 130, such as, but not a Microsoft Excel™ format or an XML™ format compatible with, and interpretable by, database application 156.

If, for example, the executed programmatic bot were unable to validate the request message, or if the executed programmatic bot were to determine that the structure or format of the resource template file is incompatible with, or not interpretable by, the one or more application programs executed by analytical system 130, the executed programmatic bot may establish that the request message corresponds to an invalid request (e.g., step 406; NO), and may perform any of the exemplary processes described herein (e.g., in accordance with the provisioned elements of processing logic) to generate an error message confirming the failure of the validation process, which analytical system 130 may transmit across network to client device 102 (e.g., in step 408 of FIG. 4). In some instances, the transmitted error message may correspond to an email message structured in accordance with one or more email-based communications protocols, upon transmission of the error message, analytical system 130 may discard the received request message. Exemplary process 400 is complete in step 410.

Alternatively, if the executed programmatic bot were to validate successfully the request message, and if the executed programmatic bot were to confirm the compatibility and interpretability of the resource template file by the one or more application programs executed by analytical system 130, the executed programmatic bot may determine that the request message corresponds to a valid request (e.g., step 406; YES). In some instances, the executed programmatic bot may perform any of the exemplary processes described herein, in accordance with the provisioned elements of processing logic, that obtain the resource template file from the request message, and that select one or more rows of the resource template file that are associated with a corresponding procurement or R&D appropriation requested during a budget cycle (e.g., in step 412 of FIG. 4). Consistent with the provisioned elements of processing logic, the executed programmatic bot may perform any of the exemplary processes described herein to confirm a presence, within corresponding columns of the one or more selected rows, of the certain appropriation data identifying and characterizing the requested procurement or R&D appropriation (e.g., in step 414 of FIG. 4).

By way of example, the executed programmatic bot may execute object 230B, and based on programmatic input (e.g., consistent with application model 226B and the elements of action data 228B) provisioned to GUI 156A of executed database application 156, executed object 230B may perform operations, described herein, that access the one or more selected rows of the resource template file, and access each of the elements of appropriation data from the corresponding columns of the selected rows. As described herein, examples of the appropriation data may include, but are not limited to, one or more keywords that specify the corresponding procurement or R&D appropriation (e.g., an appropriation identifier, a corresponding budget activity or sub activity, etc.), an alphanumeric program code associated with appropriation, and a title of a corresponding resource.

If the executed programmatic bot were to determine that one or more of the elements of appropriation data were missing from the one or more selected rows (e.g., step 414; NO), the executed programmatic bot may perform operations consistent with the provisioned elements of processing logic, described herein, that generate one or more elements of exception data identifying the accessed row or rows and the missing elements of appropriation data (e.g., in step 416 of FIG. 4), and that establish whether the resource template file includes additional rows awaiting processing (e.g., in step 418 of FIG. 4). If, for example, analytical system 130 were to determine that one or more additional rows of resource template file await processing (e.g., step 418; YES), exemplary process 400 may pass back to step 410, and analytical system 130 may perform any of the exemplary processes described herein to access the one or more additional rows of the resource template file.

Alternatively, if the executed programmatic bot were to determine that no further rows of resource template file await processing (e.g., step 418; NO), the executed programmatic bot may perform operations (e.g., in accordance with the provisioned elements of processing logic) that determine whether the received request includes any additional, and unprocessed, resource template files (e.g., in step 420 of FIG. 4). If, for example, the executed programmatic bot were to determine that the received request includes an additional resource template file that remains unprocessed using the exemplary processes described herein (e.g., step 420; YES), the executed programmatic bot may perform any of the exemplary processes described herein (e.g., in accordance with the provisioned elements of processing logic) to obtain that additional resource template file from the request message (e.g., in step 422 of FIG. 4). Exemplary process 400 may pass back to step 412, and the executed programmatic bot may perform any of the exemplary processes described herein to access the one or more rows of the additional resource template file associated with a corresponding, procurement or R&D appropriation requested during a corresponding budget cycle (e.g., in accordance with the provisioned elements of processing logic). Alternatively, if the executed programmatic bot were to determine that the received request includes no additional and unprocessed resource template files (e.g., step 420; NO), exemplary process 400 is complete in step 410.

Referring back to step 414, if the executed programmatic bot were to determine that the columns of the one or more accessed rows of the resource template file include the elements of appropriation data (e.g., step 414; YES), the executed programmatic bot may perform processes consistent with the provisioned elements of processing logic, as described herein, to generate a database population request associated with the one or more accessed rows of the resource template file (e.g., in step 424 of FIG. 4). By way of example, and in accordance with the provisioned elements of processing logic, the executed programmatic bot may generate, and assigned to the one or more selected rows of the resource template file, a corresponding procurement-specific or R&D-specific key code based on appropriation identifier obtained by executed object 230B, and may perform operations that package the procurement-specific or R&D-specific key code, and the program code and title, into corresponding portions of the database population request (e.g., in step 424), and that store the database population request at a corresponding position within a database population queue, which may be maintained within the one or more tangible, non-transitory memories of analytical system 130 (e.g., in step 426 of FIG. 4).

Further, exemplary process 400 may pass back to step 418, and the executed programmatic bot may perform operations consistent with the provisioned elements of processing logic, as described herein, that establish whether the resource template file includes additional rows that await processing. If, for example, the executed programmatic bot ere to determine that one or more additional rows of resource template file await processing (e.g., step 418; YES), exemplary process 400 may pass back to step 412, and the executed programmatic bot may perform any of the exemplary processes described herein to select one or more additional rows of the resource template file for processing.

Alternatively, if the executed programmatic bot were to determine that no further rows of resource template file await processing (e.g., step 418; NO), analytical system 130 may perform operations that determine whether the received request includes any additional resource template files which await processing (e.g., in step 420 of FIG. 4). If, for example, the executed programmatic bot were to determine that the received request includes an additional resource template file (e.g., step 420; YES), the executed programmatic bot may perform any of the exemplary processes described herein to obtain the additional resource template file from the request message (e.g., in step 422 of FIG. 4). Exemplary process 400 may pass back to step 412, and the executed programmatic bot perform any of the exemplary processes described herein to select the one or more additional rows of the resource template file for processing. Alternatively, if the executed programmatic bot were to determine that the received request includes no additional resource template files (e.g., step 420; NO), exemplary process 400 is complete in step 408.

Referring to FIG. 5, analytical system 130 may perform any of the exemplary processes described herein to instantiate one or more virtual machines provisioned with elements of object information and elements of processing logic, and additionally, or alternatively, to clone one or more previously instantiated and provisioned virtual machines (e.g., in step 502 of FIG. 5). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each which includes a corresponding one of the generated executable objects. By way of example, and as described herein, the generated executable objects may include a first executable object (e.g., executable object 230A of FIG. 2A), which may be operable with, and configured to interact with, a graphical user interface of a first application program executed by analytical system 130 (e.g., GUI 154A of document editor application 154), and a second executable object, which may be operable with, and configured to interact with, a graphical user interface of a second application program executed by analytical system 130 (e.g., GUI 156A of database application 156).

In some instances, and upon execution by analytical system 130, a programmatic bot established by a corresponding one of instantiated or cloned virtual machines may perform one or more of the exemplary processes described herein (e.g., in accordance with the provisioned elements of processing logic) to access a database population queue maintained within the tangible, non-transitory memories of analytical system 130, and to select a database population request maintained within the database population queue for processing and analysis (e.g., in step 504 of FIG. 5). The executed programmatic bot may also perform any of the exemplary processes described herein, in accordance with the provisioned elements of processing logic, to obtain at least a procurement- or R&D-specific key code and a corresponding program code and title from the selected database population request (e.g., in step 506 of FIG. 5), and to obtain one or more resource files from a data repository based on the procurement- or R&D-specific key code (e.g., in step 508 of FIG. 5). As described herein, the one or more obtained resource files may include one or more of procurement files 136 (e.g., based on the obtained procurement-specific key code) or one or more of R&D files 140 (e.g., based on the obtained R&D-specific key code), and each of the obtained resource files may be structured in a first format, such as a portable document format (PDF).

In some instances, the executed programmatic bot may perform any of the exemplary processes described herein (e.g., in accordance with the provisioned elements of processing logic) to identify, within a corresponding one of the resource files, a resource summary table that includes the a corresponding keyword (e.g., the term "Resource Summary") and the program code and title obtained from the selected database population request, and extract one or more pages of a corresponding one of the resource files that include the resource summary table (e.g., in step 510 of FIG. 5).

By way of example, the executed programmatic bot may execute object 230A, and based on programmatic input (e.g., consistent with application model 226A and the elements of action data 228A) provisioned to GUI 154A of executed document editor application 154, executed object 230A may perform operations, described herein, that cause executed document editor application 154 to execute a keyword search involving the keyword, program code, and title within the corresponding resource file, to identify one or more pages of the corresponding resource file that include the keyword, program code, and title (e.g., a resource summary table characterizing the appropriation associated with the selected database population request), and to extract the one or more identified pages from the corresponding resource file, e.g., as a separate file structured in the first format. As described herein, the one or more extracted pages of the corresponding resource file may be structured in the first format of the obtained resource file (e.g., as a PDF)

The executed programmatic bot may perform operations, described herein and consistent with the provisioned elements of processing logic, that convert the extracted pages of the corresponding resource file into tabular data structured in a second format (e.g., in step 512 of FIG. 5). By way of example, and based on additional programmatic input (e.g., consistent with application model 226A and the elements of action data 228A) provisioned to GUI 154A of executed document editor application 154, executed object 230A may perform operations, described herein, that cause executed document editor application 154 to open extracted pages 304 as a separate document, and to export the separate document into the elements of tabular data, e.g., based on an invocation of an export functionality or a local-save functionality of GUI 154A and executed document editor application 154. As described herein, the tabular data may include rows and columns that establish the resource summary table, and the tabular data may be structured in a second format that is incompatible with the first format and with executed document editor application 154, such as a Microsoft Excel™ format or an XML™ format.

The executed programmatic bot may perform operations, described herein and consistent with the provisioned elements of processing logic, that obtain a resource file associated with the selected database population request from the data repository, and select a row of the resource template file associated with the obtained program code and title (e.g., in step 514 of FIG. 5). By way of example, the executed programmatic bot may execute object 230B, and based on programmatic input (e.g., consistent with application model 226B and the elements of action data 228B) provisioned to GUI 156A of executed database application 156, executed object 230B may perform operations, described herein, that cause executed database application 156 to open the resource template file and identify one or more rows that include, within corresponding columns, the program code and title (e.g., based on an invocation of a keyword search functionality of GUI 156A and executed database application 156 using the program code and title). In some instances, each of the accessed rows may include an identifier of a corresponding parameter of the requested procurement or R&D appropriation (e.g., the procurement quantity or the total obligation authority described herein), and the programmatic input provisioned to GUI 156A may enable executed object 230B to extract the parameter identifier from a selected one of the accessed rows (e.g., one or more of the parameter identifiers described herein, such as "QTY" or "$"), and provision the extracted parameter identifier to the executed programmatic bot.

Referring back to FIG. 5, the executed programmatic bot may also perform one or more of the exemplary processes described herein (e.g., in accordance with the provisioned elements of processing logic) to access one or more rows of the tabular data that are associated with, or that include, the program code and title and further, that include or reference the parameter identifier extracted from the selected row of resource template file 204 (e.g., in step 516 of FIG. 5). In some instances, in step 516, the executed programmatic bot may perform operations, described herein and consistent with the provisioned elements of processing logic, that extract parameter values consistent with the parameter identifiers from corresponding columns of the one or more accessed rows of the tabular data. Further, the executed programmatic bot may also perform one or more of the exemplary processes described herein (e.g., in accordance with the provisioned elements of processing logic to populate one or more empty columns of the selected row of the resource template file with corresponding ones of the values extracted from the one or more rows of the tabular data, and to generate corresponding, populated rows of a populated database file (e.g., in step 518 of FIG. 5). As described herein, the populated rows may be maintained within procurement- or R&D-specific partition of the populated database file consistent with the obtained key code (e.g., a procurement-R&D-specific worksheet), and the populated database file may be structured in the second format, e.g., the Microsoft Excel™ format or an XML™ format.

By way of example, in step 516 of FIG. 5, executed object 230B may provision additional programmatic input (e.g., consistent with application model 226B and the elements of action data 228B) to GUI 156A, which may cause executed database application 156 to any of the exemplary processes described herein to open the tabular data and identify the one or more rows that include, or reference, the parameter identifier (e.g., based on an invocation of a keyword search functionality of GUI 156A and executed database application 156 using the parameter identifier), and to extract parameter values consistent with the parameter identifier from the one or more identified rows (e.g., based on an invocation of a copy functionality of GUI 156A and executed database application 156). Further, in step 518 of FIG. 5, and based on further programmatic input provisioned to GUI 156A by executed object 230B, executed database application 156 may perform any of the exemplary processes described herein to open the resource template file, identify the selected row that includes the program code and title, and that includes or references the parameter identifier (e.g., based on an invocation of a keyword search functionality of GUI 156A and executed database application 156 using the program code, title, and parameter identifier), and that populate one or more empty columns of the selected row with corresponding ones of the extracted parameter values (e.g., based on an invocation of a paste functionality of GUI 156A and executed database application 156). Further, in some instances, additional, or alternate, programmatic input provisioned to GUI 156A by executed object 230B may cause executed database application 156 to save the populated row of the resource template file as corresponding, populated row within the appropriate one of the procurement- or R&D-specific partition of the populated database file (e.g., based on a programmatic invocation of a "save" functionality of GUI 156A and executed database application 156).

Referring back to FIG. 5, the executed programmatic bot may perform operations, consistent with the provisioned elements of processing logic, that determine whether additional rows of the resource template file that include or reference the obtained program code and title await population with corresponding values maintained within the template data (e.g., in step 520 of FIG. 5). For example, if the executed programmatic bot were to determine that no additional rows await population (e.g., step 520; NO), the populate database file includes each of the populated rows associated with the selected database population request, and the executed programmatic bot may perform any of the exemplary processes described herein (e.g., in accordance with the provisioned elements of processing logic) to delete the selected database population request from the database population queue (e.g., in step 522 of FIG. 5), and to determine whether additional database population requests await processing within the database population queue (e.g., in step 524 of FIG. 5).

If, for example, the executed programmatic bot were to determine that an additional database population request within the database population queue awaits processing (e.g., step 524; YES), the executed programmatic bot may pass back to step 504, and the executed programmatic bot may select an additional one of the queued database population requests for processing using any of the exemplary processes described herein. Alternatively, if the executed programmatic bot were to determine that no additional database population requests await processing (e.g., step 524; NO), the executed programmatic bot may perform any of the exemplary processes described herein to generate a message that includes at least the populated database file, and to cause analytical system 130 to transmit the generated message to a computing system or device, such as client device 102 (e.g., in step 526 of FIG. 5). Exemplary process 500 is then complete in step 522.

Referring back to step 520, if the executed programmatic bot were to determine that additional rows of the resource template file include the program identifier and title and await population (e.g., step 520; YES), exemplary process 500 may pass back to step 514, and the executed programmatic bot may perform operations, described herein and consistent with the provisioned elements of processing logic, that select an additional row of the resource template file associated with the obtained program code and title.

B. Exemplary Computerized Implementations

Embodiments of the subject matter and the functional operations described in this specification may be implemented in digital electronic circuitry, in tangibly embodied computer software or firmware, in computer hardware, including the structures disclosed in this specification and their structural equivalents, or in combinations of one or more of them. Exemplary embodiments of the subject matter described in this specification, such as, but not limited to, web browser 106, email application 108, database application 110, virtualization management engine 152, document editor application 154, database application 156, programmatic web service 174, application programming interfaces (APIs) 214 and 328, intake engine 216, virtual machine 220, processing logic 224, objects 230A and 230B, programmatic bot 232, validation module 234, decomposition module 236, parsing module 302, and database population module 308, may be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions may be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program may be deployed for execution on one computer or on multiple computers that are located at one site or distributed across multiple sites and interconnected by a communication network.

The processes and logic flows described in this specification may be performed by one or more programmable computers executing one or more computer programs to perform functions by operating on input data and generating output. The processes and logic flows can also be performed by, and apparatus may also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer may also include, or be operatively coupled to receive data from or transfer data to, or both, one or more mass storage devices for storing data, such as magnetic, magneto-optical disks, or optical disks. However, a computer need not have such devices. Moreover, a computer may be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices may be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system may be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, may be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a memory storing instructions;
   a communications interface; and
   at least one processor coupled to the memory and the communications interface, the at least one processor being configured to execute the instructions to:
   receive a request message from a device via the communications interface, and based on the request message, generate and store queued request data within a request queue, the request queue being maintained within a corresponding portion of the memory;
   obtain the queued request data from the request queue, the queued request data comprising a key code and a program code associated with a corresponding resource;
   perform operations that instantiate a virtual machine provisioned with object information and elements of processing logic, and the object information comprising information that characterizes a first application model associated with a first application program and a second application model associated with a second application program;
   execute the virtual machine in accordance with the elements of processing logic to:
   based on the key code, obtain resource files structured in a first format associated with the first application program, and perform operations that extract elements of resource data that include at least the program code from a corresponding one of the resource files, and that convert the extracted elements of resource data into elements of tabular data structured in a second format associated with the second application program; and
   generate elements of a populated database associated with the corresponding resource based on the elements of tabular data, and transmit, via the communications interface, message data that includes at least the elements of the populated database to a device, the elements of the populated database being structured in the second format, and the message data causing the device to execute the second application program that presents at least a subset of the elements of the populated database within a digital interface.

2. The apparatus of claim 1, wherein:
the elements of tabular data associate the program code with one or more values of parameters that characterize the resource during corresponding temporal intervals; and
the generated elements of the populated database include the program code and at least a subset of the parameter values that characterize the resource during corresponding ones of the temporal intervals.

3. The apparatus of claim 2, wherein the corresponding temporal intervals comprises a current fiscal year, at least one prior fiscal year, and at least one future temporal interval.

4. The apparatus of claim 1, wherein:
the queued request data includes a template identifier associated with a template file,
the template file being structured in the second format; and
the at least one processor is further configured to execute the instructions to:
obtain the template file from a portion of the memory based on the template identifier;
perform operations that identify an element of the template file that includes the program code, the element of the template file specifying a plurality of temporal intervals;
obtain, from the elements of tabular data, a value of a parameter that characterizes the resource during each of the specified temporal intervals;
perform operations that populate the element of the template file with the parameter values, the populated element of the template file associating each of the parameter values with a corresponding one of the specified temporal intervals and with the program code; and
generating the elements of the populated database based on the populated element of the template file.

5. The apparatus of claim 4, wherein the at least one processor is further configured to execute the instructions to:
obtain a parameter identifier associated with the parameter values from the element of the template file that includes the program code; and
based on the parameter identifier, obtain the parameter values that characterize the resource during the temporal intervals from at least a subset of the elements of tabular data.

6. The apparatus of claim 1, wherein the request message comprises a template file and the at least one processor is further configured to execute the instructions to:
receive a request message from the device via the communications interface, the request message comprising a template file;
obtain a value of the program code from at least one element of the template file, and generate a value of the key code based on at least one element of the template file; and
generate the queued request data based on the value of the program code and the value of the key code, and perform operations that store the queued request data within a corresponding position of the request queue, the request queue being maintained within a corresponding portion of the memory.

7. The apparatus of claim 1, wherein the executed virtual machine performs operations that:
obtain the queued request data from a request queue, the request queue being maintained within a corresponding portion of the memory; and
delete the queued request data from the request queue based on the generation of the elements of the populated database.

8. The apparatus of claim 1, wherein:
the at least one processor is further configured to execute the first application program;
the executed virtual machine performs operations consistent with the first application model that access a first digital interface of the executed first application program, and that provide elements of first programmatic input to the first digital interface; and
the elements of first programmatic input cause the executed first application program to identify the elements of resource data within the corresponding one of the resource files that includes the program code, extract the elements of resource data from the corresponding one of the resource files, and convert the convert the extracted elements of resource data into the elements of tabular data.

9. The apparatus of claim 1, wherein:
the at least one processor is further configured to execute the second application program;
the executed virtual machine performs operations consistent with the second application model that access a second digital interface of the executed second application program, and that provide elements of second programmatic input to the second digital interface; and
the elements of second programmatic input causing the executed second application program to access the elements of tabular data and to generate the elements of the populated database based on the accessed elements of tabular data.

10. A computer-implemented method, comprising:
receiving a request message from a device using at least one processor, and based on the request message, generate and store queued request data within a request queue;
obtaining the queued request data from the request queue using the at least one processor, the queued request data comprising a key code and a program code associated with a corresponding resource;
performing operations, using the at least one processor, that instantiate a virtual machine provisioned with object information and elements of processing logic, and the object information comprising information that characterizes a first application model associated with a first application program and a second application model associated with a second application program;
executing the virtual machine, using the at least one processor, in accordance with the elements of processing logic to perform additional steps of the method, comprising:
based on the key code, and using the at least one processor, obtaining resource files structured in a first format associated with the first application program, and performing operations, using the at least one processor, that extract elements of resource data that include at least the program code from a corresponding one of the resource files, and that convert the extracted elements of resource data into elements of tabular data structured in a second format associated with the second application program; and generating, using the at least one processor, elements of a populated database associated with the corresponding resource based on the elements of tabular data, and transmitting message data that includes at least the elements of the populated database to a device using the at least one processor, the elements of the populated database being structured in the second format, and the message data causing the device to execute the second application program that presents at least a subset of the elements of the populated database within a digital interface.

11. The computer-implemented method of claim 10, wherein:

the elements of tabular data associate the program code with one or more values of parameters that characterize the resource during corresponding temporal intervals;

the generated elements of the populated database include the program code and at least a subset of the parameter values that characterize the resource during corresponding ones of the temporal intervals; and the corresponding temporal intervals comprises a current fiscal year, at least one prior fiscal year, and at least one future temporal interval.

12. The computer-implemented method of claim 10, wherein:

the queued request data includes a template identifier associated with a template file, the template file being structured in the second format;

the computer-implemented method further comprises:

obtaining, using the at least one processor, the template file from a portion of a data repository based on the template identifier;

performing operations, using the at least one processor, that identify an element of the template file that includes the program code, the element of the template file specifying a plurality of temporal intervals;

using the at least one processor, obtaining, from the elements of tabular data, a value of a parameter that characterizes the resource during each of the specified temporal intervals; and performing operations, using the at least one processor, that populate the element of the template file with the parameter values, the populated element of the template file associating each of the parameter values with a corresponding one of the specified temporal intervals and with the program code; and the generating comprises generating the elements of the populated database based on the populated element of the template file.

13. The computer-implemented method of claim 12, further comprising:

obtaining, using the at least one processor, a parameter identifier associated with the parameter values from the element of the template file that includes the program code; and obtaining, using the at least one processor, the parameter values that characterizes the resource during the temporal intervals from at least a subset of the elements of tabular data based on the parameter identifier.

14. The computer-implemented method of claim 10, wherein the request message comprises a template file and the method further comprising comprises:

receiving a request message from the device via the using the at least one processor, the request message comprising a template file;

using the at least one processor, obtaining a value of the program code from at least one element of the template file, and generating a value of the key code based on at least one element of the template file; and generating, using the at least one processor, the queued request data based on the value of the program code and the value of the key code, and performing operations, using the at least one processor, that store the queued request data within a corresponding position of the request queue, the request queue being maintained within a corresponding portion of a data repository.

15. The computer-implemented method of claim 10, wherein the executed virtual machine performs operations that:

obtain the queued request data from a request queue, the request queue being maintained within a corresponding portion of the memory; and delete the queued request data from the request queue based on the generation of the elements of the populated database.

16. The computer-implemented method of claim 10, wherein:

the computer-implemented method further comprises executing the first application program using the at least one processor;

the executed virtual machine performs operations consistent with the first application model that access a first digital interface of the executed first application program, and that provide elements of first programmatic input to the first digital interface; and the elements of first programmatic input cause the executed first application to identify the elements of resource data within the corresponding one of the resource files that includes the program code, extract the elements of resource data from the corresponding one of the resource files, and convert the convert the extracted elements of resource data into the elements of tabular data.

17. The computer-implemented method of claim 10, wherein:

the computer-implemented method further comprises executing the second application program using the at least one processor;

the executed virtual machine performs operations consistent with the second application model that access a second digital interface of the executed second application program, and that provide elements of second programmatic input to the second digital interface; and the elements of second programmatic input causing the executed second application program to access the elements of tabular data and to generate the elements of the populated database based on the accessed elements of tabular data.

18. A tangible, non-transitory computer-readable medium storing instructions that, when executed by at least one processor, cause the at least one processor to perform a method, comprising:

receiving a request message from a device using at least one processor, and based on the request message, generate and store queued request data within a request queue;

obtaining the queued request data from the request queue, the queued request data comprising a key code and a program code associated with a corresponding resource;

performing operations that instantiate a virtual machine provisioned with object information and elements of processing logic, and the object information comprising information that characterizes a first application model associated with a first application program and a second application model associated with a second application program;

executing the virtual machine in accordance with the elements of processing logic, causing the at least one processor to perform additional steps of the method, comprising:

based on the key code, obtaining resource files structured in a first format associated with the first application program, and performing operations that extract elements of resource data that include at least the program code from a corresponding one of the resource files, and that convert the extracted elements of resource data into elements of tabular data structured in a second format associated with the second application program; and generating elements of a populated database associated with the corresponding resource based on the elements of tabular data, and transmitting message data that includes at least the elements of the populated database to a device, the elements of the populated database being structured in the second format, and the message data causing the device to execute the second application program that presents at least a subset of the elements of the populated database within a digital interface.

19. The apparatus of claim 1, wherein the at least one processor is further configured to execute the instructions to:

execute the first application program, and performs operations that access a first digital interface of the executed first application program and that provide elements of first programmatic input to the first digital interface, the elements of first programmatic input causing the executed first application to identify the elements of resource data within the corresponding one of the resource files that includes the program code, extract the elements of resource data from the corresponding one of the resource files, and convert the convert the extracted elements of resource data into the elements of tabular data; and execute the second application program, and perform operations that access a second digital interface of the executed second application program and that provide elements of second programmatic input to the second digital interface, the elements of second programmatic input causing the executed second application program to access the elements of tabular data and to generate the elements of the populated database based on the accessed elements of tabular data.

\* \* \* \* \*